(12) United States Patent
Sethuraman et al.

(10) Patent No.: US 8,428,118 B2
(45) Date of Patent: Apr. 23, 2013

(54) TECHNIQUE FOR TRANSCODING MPEG-2/MPEG-4 BITSTREAM TO H.264 BITSTREAM

(75) Inventors: Sriram Sethuraman, Bangalore (IN); Arvind Raman, Karnataka (IN); Ashwini Kumar, Karnataka (IN); Malavika Bhaskaranand, Karnataka (IN); Omkiran Sharma, Karnataka (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1779 days.

(21) Appl. No.: 11/465,129

(22) Filed: Aug. 17, 2006

(65) Prior Publication Data

US 2008/0043831 A1 Feb. 21, 2008

(51) Int. Cl.
*H04N 7/12* (2006.01)
*H04N 11/02* (2006.01)

(52) U.S. Cl.
USPC .................................. 375/240.01; 375/240.16

(58) Field of Classification Search ............. 375/240
See application file for complete search history.

(56) References Cited

U.S. PATENT DOCUMENTS

| | | | |
|---|---|---|---|
| 2002/0133486 A1* | 9/2002 | Yanagihara et al. | 707/3 |
| 2004/0141554 A1* | 7/2004 | Phong et al. | 375/240.12 |
| 2004/0223612 A1* | 11/2004 | Kamijoh et al. | 380/201 |
| 2006/0039473 A1 | 2/2006 | Filippini et al. | |
| 2006/0203915 A1* | 9/2006 | Wada | 375/240.16 |
| 2007/0030904 A1* | 2/2007 | Winger et al. | 375/240.16 |

OTHER PUBLICATIONS

Ahmad et al.: Video Transcoding: An Overview of Various Techniques and Research Issues, IEEE Transactions on Multimedia, vol. 7, No. 5, Oct. 2005.*

Shen, B. ; Efficient deblocking and optimal quantizer selection for video transcoding, Image Processing, 2003. ICIP 2003. Proceedings. 2003 International Conference on, 2003 , pp. I-193-6 vol. 1.*

(Continued)

*Primary Examiner* — Sath V Perungavoor
*Assistant Examiner* — Xiaolan Xu
(74) *Attorney, Agent, or Firm* — Prakash Nama; Global IP Services, PLLC

(57) ABSTRACT

A method/system of transcoding an MPEG 2/4 bit stream into an H.264 format, handles an input MPEG 2/4 bit stream in a decoder, and identifies certain data in the input bit stream for reuse in the H.264 format; and, reuses the identified data in a re-encoder with assistance from a mapping module in transcoding by converting the input bit stream into an output H.264 format. The identified data includes information at a macrolevel and information at a picture level. The information at the macrolevel might comprise additional stages incorporated in the re-encoder module including a Mapping Process stage, a Sub Pixel Refinement stage, a Mode Selection stage to choose from Intra, Inter or Skip modes, followed by the standard H.264 encoding loop and the Entropy Coding Block. The information at the picture level might include; a) average quantizer of frame, and, b) total bits per frame.

27 Claims, 16 Drawing Sheets

OTHER PUBLICATIONS

Zhi Zhou; Shijun Sun; Shawmin Lei; Ming-Ting Sun; Motion information and coding mode reuse for MPEG-2 to H.264 transcoding, 2005, pp. 1230-1233 vol. 2.*

Siwei Ma, Student Member, IEEE, Wen Gao, Member, IEEE, and Yan Lu, Rate-Distortion Analysis for H.264/AVC Video Coding and its Application to Rate Control, IEEE Transactions on Circuits and Systems for Video Technology, vol. 15, No. 12, Dec. 2005.*

Efficient Block Size Selection for MPEG-2 to H.264 transcoding, in International Multimedia conference, 12$^{th}$ Annual ACM international conference on Multimedia, 2004, ISBN 1-58113-893-8, pp. 300-303, Gao Chen et al.

MPEG-2 to H.264 Transcoding, Chen Chen et al, Graduate Institute of Communications Engineering, Dept of Electrical Engineering, National Taiwan University, Taipei, Taiwan 10617, ROC.

MPEG-2 to H.264/AVC transcoding for efficient storage of broadcast video bitstreams, Mitsubishi Electric Research Labs, by Jun Xim et al, TR 2006-003, Dec. 2005.

* cited by examiner

MB modes supported by MPEG-2

| Progressive / Interlaced | Pic type | Pic structure | Forward prediction | Backward prediction | Bi-dir prediction | 16x16 partition | 16x8 partition |
|---|---|---|---|---|---|---|---|
| Progressive | P | Frame | • | | | • | |
| | B | Frame | • | • | • | • | |
| Interlaced | P | Frame | • | | | • | |
| | | Field | • | | | • | • |
| | B | Frame | • | • | • | • | |
| | | Field | • | • | • | • | • |

MB modes supported by MPEG-4

| Progressive / Interlaced | Pic type | Pic structure | Forward prediction | Backward prediction | Bi-dir prediction | 16x16 partition | 8x8 partition |
|---|---|---|---|---|---|---|---|
| Progressive | P | Frame | • | | | • | • |
| | B | Frame | • | • | • | • | • |
| Interlaced | P | Frame | • | | | • | |
| | | Field | • | | | • | |
| | B | Frame | • | • | • | • | |
| | | Field | • | • | • | • | |

MB modes supported by H.264

| Progressive / Interlaced | Pic type | Pic structure | Forward prediction | Backward prediction | Bi-dir prediction | MB / Sub-MB partitions |
|---|---|---|---|---|---|---|
| Progressive | P | Frame | • | | | ALL. MB partitions - [16x16, 16x8, 8x16, 8x8] Sub-Mb partitions - [8x4, 4x8, 4x4] |
| | B | Frame | • | • | • | |
| Interlaced | P | Frame | • | | | |
| | | Field | • | | | |
| | B | Frame | • | • | • | |
| | | Field | • | • | • | |

FIG 3

| Organization of MBs | | | | Mapping of data from input to output | | | |
|---|---|---|---|---|---|---|---|
| Input | | Output | | Input | | Output | |
| MB idx | Region | MB idx | Region | Region | Size | Region | Size |
| 1 | a | 1 | A | a | 8x8 | A | 4x4 |
| | b | | B | b | 8x8 | B | 4x4 |
| | c | | E | e | 8x8 | E | 4x4 |
| | d | | F | f | 8x8 | F | 4x4 |
| 2 | e | | C | c | 8x8 | C | 4x4 |
| | f | | D | d | 8x8 | D | 4x4 |
| | g | | G | g | 8x8 | G | 4x4 |
| | h | | H | h | 8x8 | H | 4x4 |
| 3 | i | | I | i | 8x8 | I | 4x4 |
| | j | | J | j | 8x8 | J | 4x4 |
| | k | | M | m | 8x8 | M | 4x4 |
| | l | | N | n | 8x8 | N | 4x4 |
| 4 | m | | K | k | 8x8 | K | 4x4 |
| | n | | L | l | 8x8 | L | 4x4 |
| | o | | O | o | 8x8 | O | 4x4 |
| | p | | P | p | 8x8 | P | 4x4 |

Legend:
x - Full pixel locations
o - Half pixel locations
• - Quarter pixel locations

TECHNIQUE FOR TRANSCODING MPEG-2/MPEG-4 BITSTREAM TO H.264 BITSTREAM

FIELD OF THE INVENTION

This invention relates generally to the field of video compression and more specifically to a technique for transcoding of a MPEG-2/MPEG-4 bit stream to a H.264 bit stream.

BACKGROUND OF THE INVENTION

Digital video coding standards, like MPEG-1, MPEG-2, and MPEG-4 have been the engines behind the commercial success of digital video compression and are found in many application scenarios such as broadcast, satellite, cable and terrestrial transmission channels, wireless real-time conversational services, internet video streaming and storage formats (like DVD, and digital camcorders).

MPEG-2 is the current video coding standard of choice of the broadcast video industry, operating at bit rates from around 3 to 10 Mbps, and provides inter-operable ways of representing audio visual content commonly used in digital media and in digital transmission. Also, MPEG-4 extends this to many more application areas through features including its extended bit rate range, scalability and error resilience.

The emerging H.264 standard presents a rich collection of state-of-the-art video coding capabilities that can provide inter-operable video broadcast or communication with degrees of capability that far surpass those of prior standards. The H.264 standard was jointly developed by the Video Coding Experts Group (VCEG) of the ITU-T and the Moving Picture Experts Group (MPEG) of ISO/IEC to primarily achieve enhanced coding efficiency and to accommodate a wider variety of bandwidth requirements and picture formats. It uses state-of-the-art coding tools and provides enhanced coding efficiency for a wide range of applications, including video telephony, video conferencing, TV, storage (DVD and/or hard disk based, especially high-definition DVD), streaming video, digital video authoring, digital cinema, and many other applications.

Conversion of existing MPEG-2/MPEG-4 content into H.264 format would open new possibilities in the areas of storage and broadcast, such as squeezing more TV programs into a given channel bandwidth, delivering quality video over bandwidth-constrained networks and fitting a high definition movie feature onto a standard DVD. Since MPEG-4 standard is a logical extension of MPEG-2, transcoding of MPEG-2 format content to MPEG-4 format is fairly straight forward. However, H.264 is a substantially more complex standard than MPEG-2/MPEG-4. Hence trans-coding a MPEG-2/MPEG-4 bit stream into H.264 format would involve a high degree of complexity.

SUMMARY OF THE INVENTION

The present invention provides for transcoding an input MPEG-2/MPEG-4 bit stream into an H.264 format by reusing certain data in the input bit stream in a re-encoder. In one form, the invention resides in a system for transcoding an MPEG-2/MPEG-4 bit stream into an H.264 format, comprising: a decoder for handling an input MPEG-2/MPEG-4 bit stream and for identifying certain data in the input stream that can be reused; a re-encoder for reusing said certain identified data, and using the identified data with the help of a mapping module, for converting the input bit stream into the H.264 format. The identified data might include information at a macro-block (MB) level and information at a slice, picture or sequence level. The information at the MB level will be utilized by a mapping process stage and a trans-rating unit incorporated in the re-encoder module. The information at the picture level includes; a) total bits per frame b) Sum of Absolute Difference (SAD) of the residual over the entire picture c) average quantizer of frame and d) the number of intra MBs in the picture. Further, the system might include an image processing unit between the decoder and the re-encoder like a trans-scaler unit to change the resolution of input sequence, a coding artifact reduction unit or other video processing engines like a de-interlacer that converts interlaced output of decoder to a progressive input to the re-encoder.

The invention in another form resides in a method of transcoding a first input block-based motion compensated transform coding based video format stream, into a second block-based motion compensated transform coding based output video format stream comprising the steps of: handling said first video format stream in a decoder and identifying certain data in said first video format stream that could be used in the second video format stream; and using a re-encoder with help from a mapping module for producing an output video stream conforming to said second video format. Variations and modifications to the above method are conceivable and are dealt with in the description that follows. Also taught herein is a computer readable medium encoded with data/instruction which when executed by a computing platform results in execution of the method of the invention.

BRIEF DESCRIPTION OF THE DRAWING

A detailed description of one or more embodiments of the invention is provided hereinafter along with accompanying figures that illustrate by way of example the principles of the invention, wherein:

FIG. 3 contains tables that mention the different MB (Macro Block) modes that are supported by the three standards relating to MPEG-2, MPEG-4 and H.264;

FIG. 17 shows the two layer search done during the half pixel refinement stage in an effort to optimize it; and, FIG. 18 shows the two layer search done during the quarter pixel refinement stage in an effort to optimize it.

While the invention is described in connection with certain exemplary embodiments, it should be understood that the invention is not limited to any specific embodiment. On the contrary, the scope of the invention is limited only by the appended claims and the claim equivalents, and the invention encompasses numerous alternatives, modifications and equivalents. For the purpose of example, numerous specific details are set forth in the following description in order to provide a thorough understanding of the present invention.

DETAILED DESCRIPTION

In the following detailed description of the preferred embodiments, reference is made to the accompanying drawings that form a part hereof, and in which are shown by way of illustration, specific embodiments in which the invention may be practiced. It is understood that other embodiments may be utilized and certain changes may be made without departing from the scope of the present invention.

The proposed technique provides a mechanism for a low complexity transcoding of MPEG-2/MPEG-4 format bit stream into H.264 format bit stream.

Figure 1:
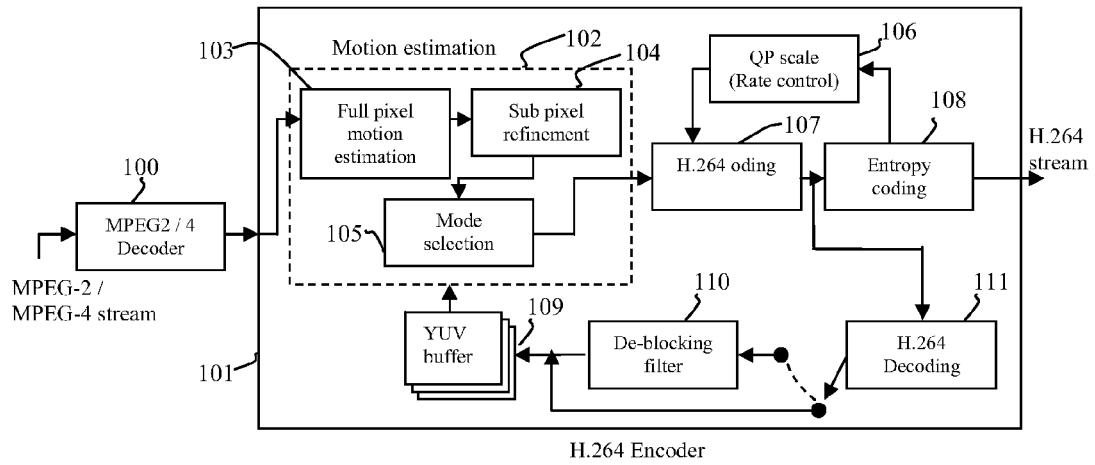
FIG. 1 illustrates a brute force trans-coder that converts a MPEG-2/MPEG-4 stream to a H.264 stream.

With reference to FIG. 1, in its simplest form, transcoding from MPEG-2/MPEG-4 format to H.264 format would require a MPEG-2/MPEG-4 decoder (block 100) cascaded to a H.264 encoder (block 101) to do the H-264 encoding, as shown in FIG. 1. The MPEG-2/MPEG-4 decoder (block 100) decodes the MPEG-2/MPEG-4 stream respectively. The (Luminance-Bandwidth-Chrominance)YUV 4:2:0 reconstruction buffer available at the output of the MPEG-2/MPEG-4 decoder (block 100) is connected to the H.264 encoder (block 101). Inside the motion estimation stage (block 102), the full pixel motion estimation engine (block 103) finds a coarse motion vector to reduce the temporal redundancy in the sequence. The sub-pixel refinement stage (block 104) refines the coarse motion vector to quarter pixel accurate units. The mode selection stage (block 105) finally evaluates the coding cost of the different MB modes (intra, inter, skip) and selects the mode associated with the least cost. The H.264 coding block (block 107) forward-transforms and quantizes the residual information and sends the quantized coefficients to the entropy coding block (block 108) and the H.264 decoding block (block 111). The rate control engine (block 106) takes relevant input such as the number of syntactical and residual bits used from the entropy coding engine (block 108), to compute the quantizer scale that should be used for subsequent MBs and pictures and feeds the same to the H.264 coding engine (block 107). The H.264 entropy coding engine (block 108) encodes the residual information and the corresponding syntactical data in the H.264 format. The H.264 decoding block (block 111) de-quantizes and inverse transforms the residual information. If enabled, the de-blocking filter (block 110) is called to post-process the image. The reconstructed frames are finally stored in the YUV buffers (block 109) which is then fed back to the motion estimation engine (block 102).

H.264 encoding is a highly computationally intensive operation. The proposed invention reduces the complexity of the trans-coding process by reusing certain data that is available in the input bit stream. By reusing the relevant data available in the input bit stream, this invention achieves a one-third reduction in implementation complexity.

Figure 2:
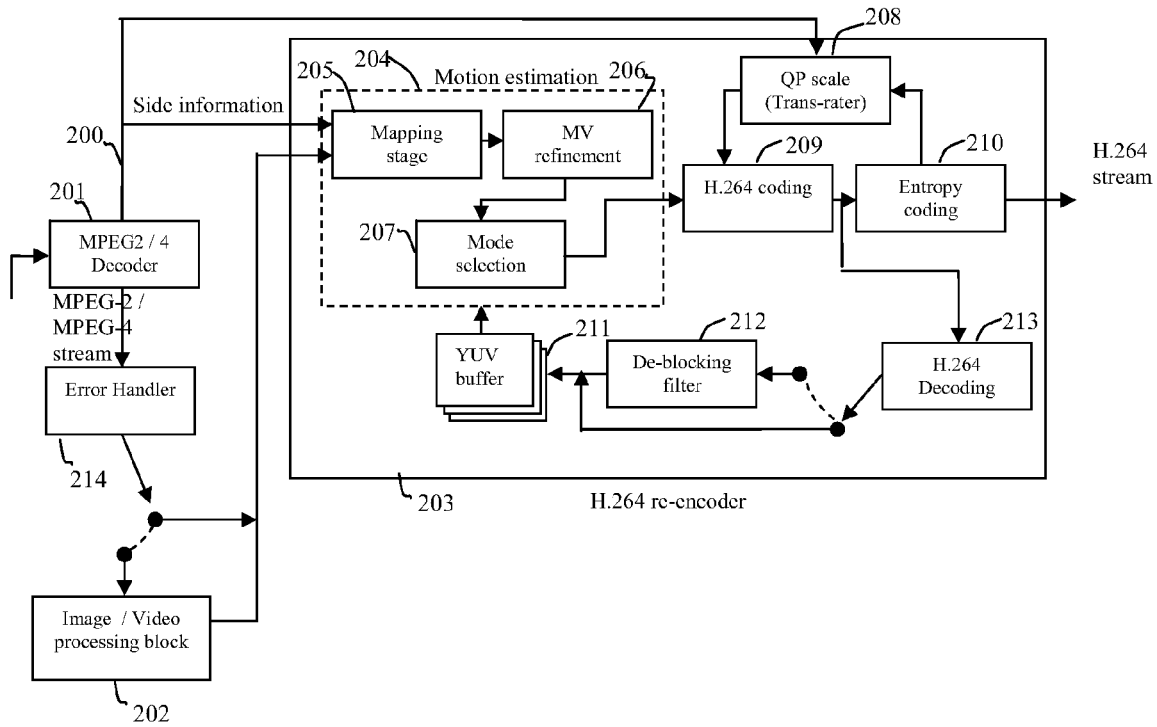
FIG. 2 illustrates an exemplary embodiment of an intelligent low complexity trans-coder that converts a MPEG-2/MPEG-4 stream to a H.264 stream.

FIG. 2 illustrates an exemplary embodiment of the present invention in the form of an intelligent low complexity version of a Trans-coder. Referring to FIG. 2, at the decoder stage (block 201), side information (200) relevant to the H.264 re-encoding process is derived from the input bit stream as shown, which is reused by the H.264 re-encoder (block 203). Any error encountered by the MPEG-2 decoder is handled by the error handler (block 214). The YUV 4:2:0 reconstruction buffers available at the output of the decoder are optionally manipulated using an image/video processing filter (block 202). An image processing filter such as a scaler could be used to down-scale the resolution of the decoder's output YUV buffers. Post processing filters such as de-blocking filters and de-ringing filters could be used to reduce the coding noise present in the decoded output. Video processing filters like a de-interlacing filter could be used to reduce interlace coding artifacts in the sequence, if the output stream in H.264 is desired in the progressive format. Similarly, a 3:2 pull down detection block could be used to detect the 3:2 pull down pattern to convert 30 fps telecine content to 24 fps film content. The side information (200) and the YUV 4:2:0 reconstruction buffers are given as inputs to the H.264 re-encoder (block 203). The mapping stage (block 205) within the motion estimation engine (block 204) translates the information such as the motion vector and the mode in which the MB was coded in the input stream into the H.264 format. This helps the trans-coder to arrive at a coarse estimate for the motion vector by just reusing the information in the input stream. The MV refinement engine (block 206) refines the mapped motion vector at a full pixel and/or sub-pixel accuracy. The mode selection engine (block 207) computes the coding cost associated with each of the modes in which a MB can be coded, and selects the mode associated with the least cost. The residual information from the motion estimation engine (block 204) is sent to the H.264 coding engine (block 209), which forward-transforms and quantizes the residual information before sending it to the entropy coding engine (block 210) and the H.264 decoding engine (block 213). The trans-rater (block 208) takes in as input the side information (200) and information like the amount of syntactical and residual bits consumed from the entropy coding engine (block 210) to compute the quantizer scale for the subsequent MBs and pictures. The entropy coding engine (block 210) encodes the quantized residual information and the corresponding syntactical information in the H.264 format. The H.264 decoding engine (block 213) de-quantizes and inverse transforms the quantized residual information. If enabled, the de-blocking filter (block 212) is called to post-process the image. The reconstructed frames are finally stored in the YUV buffers (block 211) which is then fed back to the motion estimation engine (block 204).

Comparing the H.264 encoder (block 101) in FIG. 1 and the H.264 re-encoder (block 203) in FIG. 2, it is easy to see that low complexity trans-coder differs in the sense that it has replaced the full pixel motion estimation stage (block 103) with the mapping stage (block 205) inside the motion estimation modules (block 102 and block 204 in FIG. 1 and FIG. 2 respectively) and the rate-control engine (block 106) has been replaced by a trans-rater (block 208). Both the mapping stage (block 205) and the trans-rater engine (block 208) make use of the information present in the MPEG-2/MPEG-4 stream.

The H.264 re-encoder uses the decisions made by the MPEG-2/MPEG-4 encoder as a starting point. These decisions are available in the input MPEG-2/MPEG-4 bit stream. Starting from these decisions the re-encoder refines them to select the best coding configuration. Since the re-encoder starts from a decision that was already proven good in the MPEG-2/MPEG-4 context, the complexity is reduced substantially as it now only has to refine them to select a better coding configuration.

Information from the input MPEG-2/MPEG-4 bit stream, that can be reused at the MB level includes:
1. Motion vectors for all MB partitions.
2. MB coding mode—inter (forward, backward, bi-directional, no motion compensation) or intra mode.
3. Field/Frame coding mode.
4. Quantizer scale used for the MB.
5. Sum of Absolute Difference (SAD) of residuals over a MB.
6. Bits usage (syntactical+residuals).

The proposed technique reuses the following data from the input MPEG-2/MPEG-4 bit stream, at the picture level:
1. Picture coding type.
2. Sum of Absolute Difference (SAD) of residual over the entire picture.
3. Number of Intra MBs present in the stream.
4. Average quantizer of frame.
5. Total bits per frame.

The proposed invention expediently deals with three options, namely:
1. Trans-scaling—This involves changing (down-scaling) the resolution of the input sequence.
2. Trans-coding—This involves the mapping process and the associated algorithms to decide the best mode to code the MBs in besides the encoding and the entropy coding process to code the input data in the H.264 stream format.
3. Trans-rating—This process controls the rate at which the output stream is coded.

Trans-Scaling

In the trans-scaling method of approach, a trans-scaler unit (block 202) is used to down-scale the resolution of the MPEG-2/MPEG-4 decoder's output as shown in FIG. 2. Besides reducing the complexity of the trans-coding operation, the trans-scaler unit also helps in reducing the output bit-rate of the trans-coder, since the re-encoder would have to work on a smaller picture resolution. This embodiment of the current invention supports certain commonly applied scaling ratios to the horizontal and the vertical resolution of the input picture.

The horizontal resolution can be down-scaled by a factor of ½, ⅔, ¾. The vertical resolution can be down-scaled by a factor of ½, when the horizontal scaling factor is set to ½ as mentioned in the table below.

| Configuration | Horizontal scaling | Vertical Scaling |
|---|---|---|
| I | 1 | 1 |
| II | ¾ | 1 |
| III | ⅔ | 1 |
| IV | ½ | 1 |
| V | ½ | ½ |

Trans-Coding

The second approach referenced above is trans-coding which includes the process of mapping the relevant information from the MPEG-2/MPEG-4 stream in the H.264 format, deciding the best mode to code the MB in and then finally encoding and entropy coding the residual information to convert the data into the H.264 stream format.

The mapping process intelligently handles the differences between the MPEG-2/MPEG-4 and the H.264 video coding standard. For example, MPEG-2 allows the MVs to be specified only in half pixel units. MPEG-4 allows the MVs to be specified in quarter pixel units though it is possible to specify the MVs in half pixel units as well. All MVs in H.264 are specified in quarter pixel units, the difference being that the quarter pixels in MPEG-4 and H.264 are derived using different spatial filters.

Similarly there is no 'one to one' correspondence for all MB modes supported by MPEG-2/MPEG-4 and those supported by H.264. FIG. 3 shows the different modes in which a MB can be coded in the three standards. For the case of progressive sequence a MB can be partitioned into 8×8 blocks in MPEG-4, while it can only be coded as a single 16×16 entity in MPEG-2. However, while coding interlaced sequences as frame pictures a MB can only be coded as a single 16×16 entity in both MPEG-4 and MPEG-2, with the two sets of alternating 8 pixel lines having a different MV. The H.264 standard allows a MB to be partitioned in any of the different ways mentioned in FIG. 3 irrespective of whether the sequence is being coded in the progressive or the interlaced mode.

Further, while coding interlaced sequences as frame pictures, both the MPEG-2 and MPEG-4 standards decide between the frame and the field coding mode on a MB by MB basis. In the H.264 standard however, this decision is done on a vertical pair of MBs.

When the trans-scaling option is enabled, the mapping process becomes more complicated since one MB in the output stream derives its information from many MBs in the input stream. The number of MBs in the input stream that map to a single MB in the output stream and the way this mapping is done, depends upon the configuration of the trans-scaler.

These and the other differences between the input and the output standards and the complexities introduced by scaling the resolution of the input sequence necessitates an intelligent mapping process and mode selection engine to optimally trans-code the MPEG-2/MPEG-4 stream into the H.264 format.

The first step involved in the trans-coding operation is to map the relevant information from the input MPEG-2/MPEG-4 stream in the H.264 format. As mentioned before, at the picture level, information such as the picture coding type is used to decide the picture coding type of the picture in the output stream. In general the picture in the output stream is coded in the same mode as it was coded in the output stream. The trans-coder has the ability to code any picture as an intra picture (I) and may choose to do so whenever it decides that it is the most optimum coding mode decision to make. For instance, when the input stream is corrupted with errors, the trans-coder may choose to code an Intra (I) picture once it recovers from the errors over-riding the decision that was made in the input stream. Further, if desired, while trans-coding progressive refresh MPEG-2/MPEG-4 streams the trans-coder may insert intra pictures at regular intervals to facilitate random access.

Figure 4:
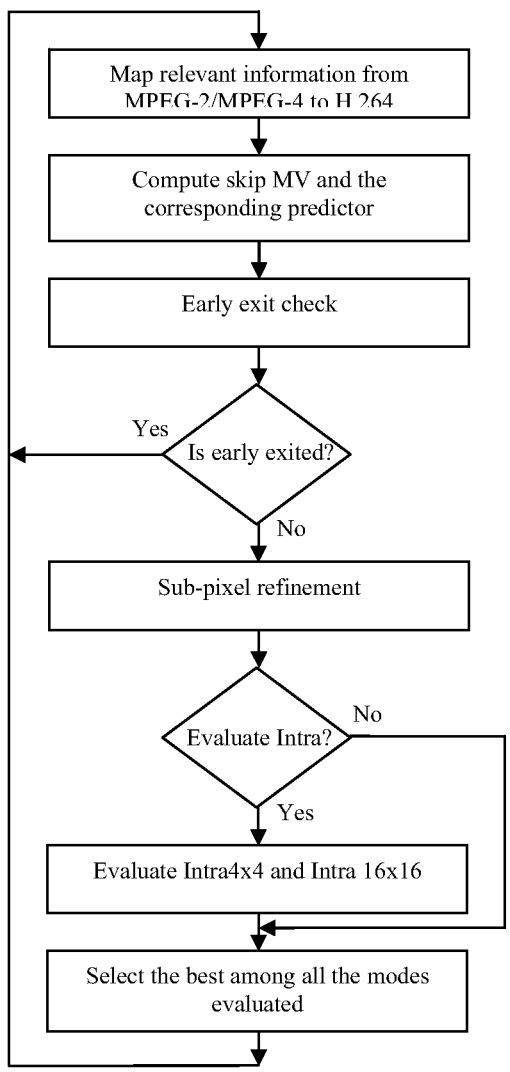
FIG. 4 illustrates the flow used by the trans-coder to decide the best coding mode for the MB in H.264 using data from the input MPEG-2/MPEG-4 stream.

The flowchart in FIG. 4 illustrates the exemplary process used to find the best coding mode for a MB in H.264 while reusing the information present in the MPEG-2/MPEG-4 stream.

The re-encoder translates the relevant MB level information from the MPEG-2/MPEG-4 stream to the H.264 format. The information used at this stage includes the mode (intra, inter, skip) in which the MB was coded in the input stream, the MVs used over the different MB partitions in case the MB is coded as an inter coded MB and information on whether the MB was coded in the frame or the field coding mode in case an interlaced picture is being coded as a frame picture.

A MB in H.264 can be coded as an inter, intra or a skip MB. The skip and the inter MB mode in MPEG-2/MPEG-4 are mapped to an inter MB in H.264. An intra MB in MPEG-2/MPEG-4 maps to an intra MB in H.264. To optimally trans-code the input stream, the trans-coder evaluates the mapped mode with the other two modes in which a MB could be coded. Thus, instead of blindly following the decisions made by the MPEG-2/MPEG-4 encoder, the trans-coder evaluates the different possible modes in which a MB could be coded before making the final decision.

After mapping the relevant information from the input stream, the re-encoder first computes the skip mode MVs and the corresponding predictor. If the residual information corresponding to the skip mode gets quantized to zero at the active quantizer scale, it declares the skip mode to be the best mode to code the MB in and exits the MB mode evaluation loop immediately (early exit).

However, if the residual information corresponding to the skip mode does not get quantized to zero at the active quantizer scale it stores the skip mode as one of the possible candidate modes to use for the current MB.

MVs found for individual MB partitions during the mapping stage are usually not the MVs that would yield the best coding cost. Besides the noise that gets added to the sequence during the MPEG-2/MPEG-4 encoding process, the H.264 trans-coding process, and the trans-scaling operation and the fact that the H.264 standard allows the MVs to be specified in quarter pixel resolution necessitates the MV refinement stage (block 206). The MV refinement stage (block 206) refines the mapped MV mapped from the MPEG-2/MPEG-4 stream and those derived for intra MBs in the input stream at the full pixel and/or half pixel accuracy. The MV that results in the least cost during the MV refinement stage (block 206) is used as the final MV for the MB partition being refined.

The intra coding mode supported in the H.264 coding standard has a better coding efficiency than the one supported in MPEG-2/MPEG-4. It is therefore possible that a MB coded as an inter or a skip MB in the MPEG-2/MPEG-4 stream may be better coded as an intra MB in the H.264 stream. Evaluating the intra MB mode for every inter or skip MB coded in the MPEG-2/MPEG-4 stream is computationally intensive and usually unnecessary. The re-encoder evaluates the intra MB mode conditioned on a criterion. If the lesser of the cost found for the skip and the inter MB mode is less than the average cost of the inter MBs coded in the previous picture of the same type, the re-encoder declares that either the skip or the inter MB mode results in a good enough match and hence the intra MB mode need not be evaluated.

However, if this is not true, the re-encoder evaluates both the intra 4×4 and the intra 16×16 mode.

The re-encoder finally compares the cost of all the MB modes evaluated until now and selects the mode associated with the least cost as the mode to code the MB in.

Mapping Stage

As mentioned before, there exist several differences between the MPEG-2/MPEG-4 and the H.264 standards. Further, when the trans-scaler is enabled, data from several MBs in the input picture is mapped to one MB in the output picture. Because of these complexities a 'one to one' mapping is usually not possible between the input and the output sequence. The mapping stage is therefore required to be intelligent to handle these differences to optimally translate the information present in the input sequence in the H.264 format.

The mapping stage is best described in three different sections. First, the way the input MB partitions physically map to partitions in the output MB. Second, the algorithm used to map the information from the input MB partitions to their corresponding output MB partitions. Here, the manner of how differences between the input and the output standards are handled is explained. Lastly, the arithmetic used to translate the MV and other relevant information in the H.264 syntax.

The MB level mapping stage re-uses information present in the input MPEG-2/MPEG-4 picture at the corresponding location in the H.264 picture. FIG. 5 to FIG. 9 pictorially illustrate how a MB or its partition in the input picture maps to a H.264 MB or one of its partitions under the different trans-scaler configurations. MBs in FIG. 5 to FIG. 9 are shown to be partitioned as 8×8 blocks, the finest MB partition possible in either the MPEG-2/MPEG-4 standard.

Figure 5:
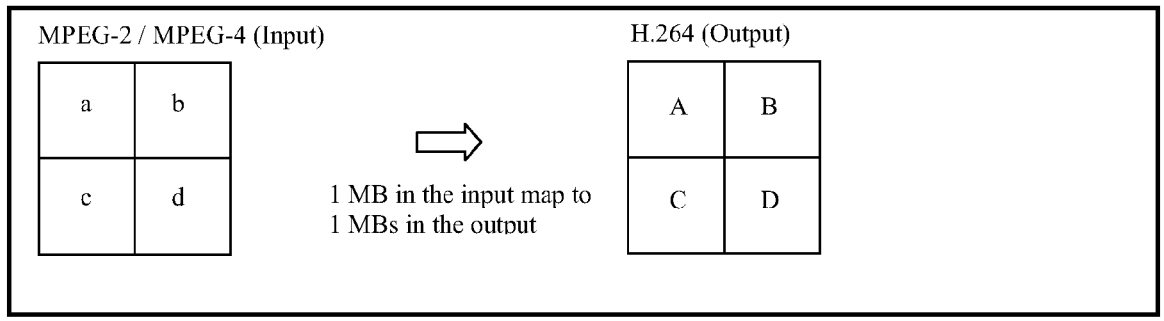
FIG. 5 shows how information is mapped from the input to the output MBs when the trans-scaler is configured in mode I.

In the most simple of all cases when the trans-scaler is disabled, mode-I, a MB in the input picture maps to a MB in the output picture. As shown in FIG. 5, if "a", "b", "c", "d" are 8×8 MB partitions of a MB in the input picture, information from these partitions is used to form partitions "A", "B", "C", "D" respectively. Each of the partitions "A", "B", "C", "D" are of size 8×8 pixels and together form a MB in the output picture.

Figure 6:
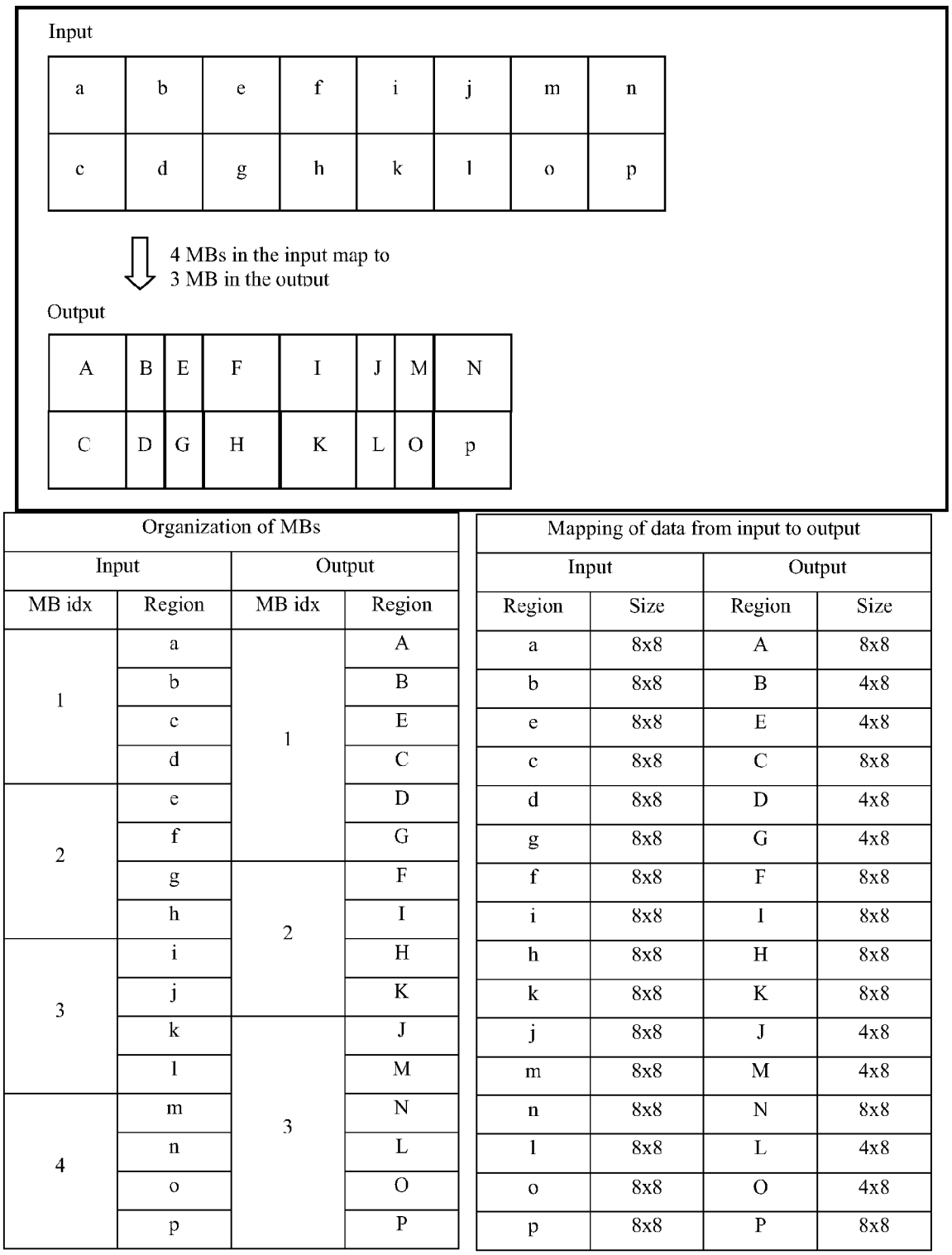
FIG. 6 illustrates how information is mapped from the input to the output MBs when the trans-scaler is configured in mode II.

When the trans-scaler is configured in mode-II, the horizontal dimension of the output picture is $\frac{3}{4}^{th}$ that of the input picture. The vertical dimension remains the same. In this mode, 4 horizontally contiguous MBs from the input picture map to 3 horizontally contiguous MBs in the output picture. In FIG. 6 "a", "b", "c", "d" are partitions of the first MB, "e", "f", "g", "h" that of the second MB, "i", "j", "k", "l" that of the third and the "m", "n", "o", "p" those of the fourth. Each of these partitions is of size 8×8 pixels. Input MB partitions "a", "b", "e", "c", "d", "g" are used to derive the information for the MB partitions "A", "B", "E", "C", "D", "G" respectively. MB partitions "A", "B", "E", "C", "D", "G" together form one MB in the output picture. MB partitions "A" and "C" are of size 8×8 pixels, while the partitions "B", "E", "D" and "G" are each of size 4×8 pixels. Similarly information from MB partitions "f", "i", "h", "k" is used to derive the relevant data for the MB partitions "F", "I", "H", "K" respectively, that together form the second MB in the output picture. All the MB partitions "F", "I", "H", "K" are of size 8×8 pixels. Lastly, information from MB partitions "j", "m", "n", "l", "o", "p" is used to form the MB partitions "J", "M", "N", "L", "O", "P" respectively, that together form the third MB in the output picture. MB partitions "J", "M", "L", "O" are each of size 4×8 pixels while MB partitions "N", "P" are of size 8×8 pixels.

Figure 7:
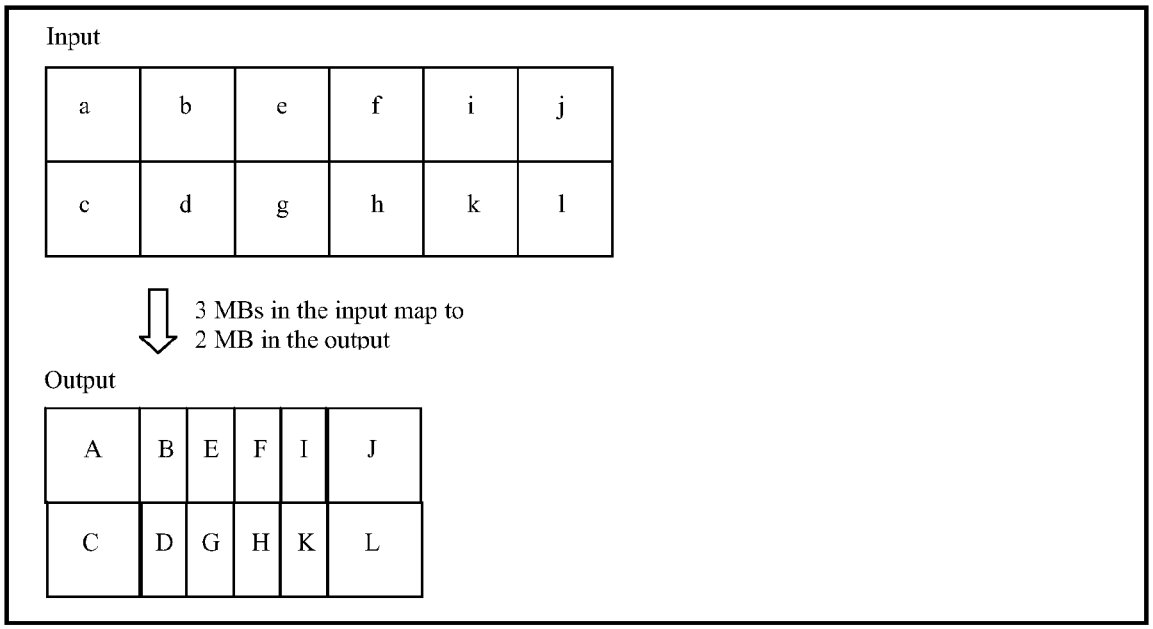
FIG. 7 shows how information is mapped from the input to the output MBs when the trans-scaler is configured in mode III.

When the trans-scaler is configured in mode-III, the horizontal dimension of the output picture is $\frac{2}{3}^{rd}$ that of the input picture. The vertical dimension remains the same. In this mode, 3 horizontally contiguous MBs from the input picture map to 2 horizontally contiguous MBs in the output picture. In FIG. 7, "a", "b", "c", "d" are partitions of the first MB, "e", "f", "g", "h" are partitions of the second MB, while "i", "j", "k", "l" are those of the third, each being of size 8×8 pixels. Input MB partitions "a", "b", "e", "c", "d", "g" are used to derive the information for the MB partitions "A", "B", "E", "C", "D", "G" respectively, that together form one MB in the output picture. MB partitions "A" and "C" are of size 8×8 pixels, while the partitions "B", "E", "D" and "G" are each of size 4×8 pixels. Input MB partitions "f", "i", "j", "h", "k", "l" are used to derive the information for the output MB partitions "F", "I", "J", "H", "K", "L" that together form the second MB in the output picture. MB partitions "F", "I", "H", "K" are each of size 4×8 pixels, while MB partitions "J" and "L" are of size 8×8 pixels.

Figure 8:
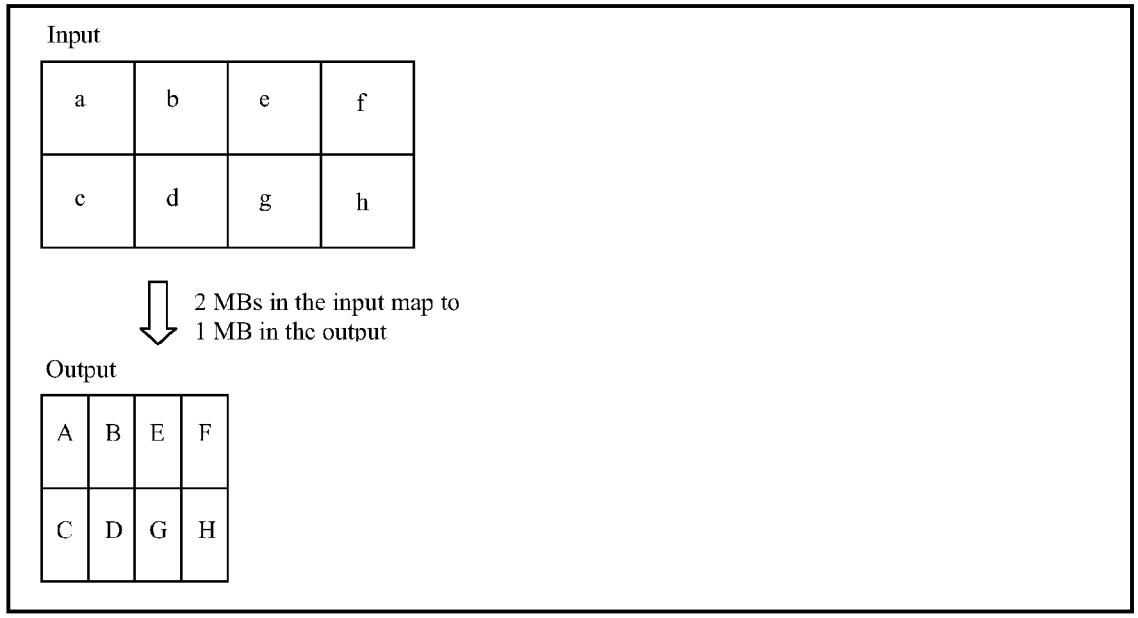
FIG. 8 shows how information is mapped from the input to the output MBs when the trans-scaler is configured in mode IV.

When the trans-scaler is configured in mode-IV, the horizontal dimension of the output picture is half that of the input picture. The vertical dimension remains the same. In this mode, 2 horizontally contiguous MBs in the input picture form 1 MB in the output picture. In FIG. 8, "a", "b", "c", "d" are partitions of the first MB, while "e", "f", "g", "h" are those of the second, each of size 8×8 pixels. Input MB partitions "a", "b", "e", "f", "c", "d", "g", "h" are used to derive the information for the MB partitions "A", "B", "E", "F", "C", "D", "G", "H" respectively that together form one MB in the output picture. Each of these output MB partitions is of size 4×8 pixels.

Figure 9:
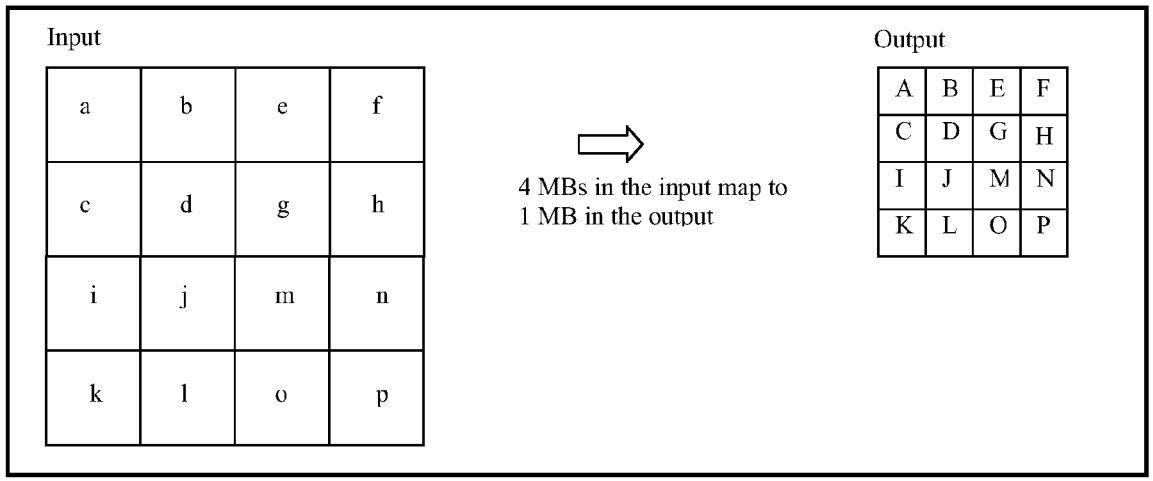
FIG. 9 shows how information is mapped from the input to the output MBs when the trans-scaler is configured in mode V.

When the trans-scaler is configured in mode-V, both the horizontal and the vertical dimension of the output picture is half that of the input picture. In this mode two rows of two horizontally contiguous MBs from the input picture map to a single MB in the output picture. In FIG. 9 "a", "b", "c", "d" are partitions of the first MB, "e", "f", "g", "h" are that of the second MB, "i", "j", "k", "l" are that of the third and "m", "n", "o", "p" are those of the fourth. Each of these MB partitions is of size 8×8 pixels. The third and the fourth MBs are horizontally contiguous to each other and vertically below the horizontally contiguous MBs one and two. Information from the input MB partitions "a", "b", "e", "f", "c", "d", "g", "h", "i", "j", "m", "n", "k", "l", "o", "p" is used to derive the relevant information for the output MB partitions "A", "B", "E", "F", "C", "D", "G", "H", "I", "J", "M", "N", "K", "L", "O", "P" respectively that together form one MB in the output picture. Each of these partitions is of size 4×4 pixels.

With the above explanation for the mapping process using the 8×8 MB partitions, it should be relatively simple to infer from these figures how information from larger MB partitions (16×16, 16×8) in the input picture would be used in the output picture. As an example, consider that the input to the trans-coder is a progressive MPEG-2 picture where the only allowed MB partition is 16×16 and that the trans-scaler has been configured in mode II as shown in FIG. 6. The input MB partitions "a", "b", "c", "d" will have the same MV information. So would be the case with each of the 4 8×8 blocks ["e", "f", "g", "h"]; ["i", "j", "k", "l"] and ["m", "n", "o", "p"]. Similarly the following groups of output MB partitions ["A", "B", "C", "D"] ["E", "F", "G", "H"]; ["I", "J", "K", "L"] and ["M", "N", "O", "P"] will have the same MV information soon after the mapping stage and hence can be individually considered as 12×16 (width×height) MB partitions. While 12×16 is not a valid H.264 MB partition, the MV refinement stage (block 206) works on this partition size because it helps it reduce the number of MB partitions that it will have to refine and that too without altering the results. The entropy coding engine (block 210) however splits the MB into valid H.264 MB partitions hence ensuring a conformant H.264 stream at the output.

The MB coding modes in the MPEG-2/MPEG-4 can be broadly classified into the following four categories—intra frame DCT mode, intra field DCT mode, inter frame MC mode, inter field MC mode. As mentioned before, with the trans-scaler enabled, an output MB in H.264 derives its information from several input MBs.

For the case of an interlaced frame picture, the input MBs could be coded in any of the four modes mentioned above. Deciding on a single coding mode for the output MB therefore is a non-trivial effort. Taking FIG. 8 as an example, it is possible that partitions "a", "b", "c", "d" belonging to the first MB have been coded in the intra frame DCT mode while the MB partitions "e", "f", "g", "h" belonging to the second MB have been coded in the inter field MC mode. Similarly, the bottom two MBs in the input picture (needed to form an output MB pair in H.264) could have been coded in the intra field DCT mode and the inter frame DCT mode respectively. The most obvious way of mapping this information from the input stream to the output MB partitions would be to code the MB partitions "A", "B", "C", "D" in the intra frame prediction mode and MB partitions "E", "F", "G", "H" as inter field prediction mode going by the physical mapping described above. This however does not result in a valid H.264 MB coding mode configuration. The trans-coder needs to decide on a single coding mode that optimally represents the information being mapped from all the different MBs present in the input stream that map to a single output MB pair.

Figure 10:
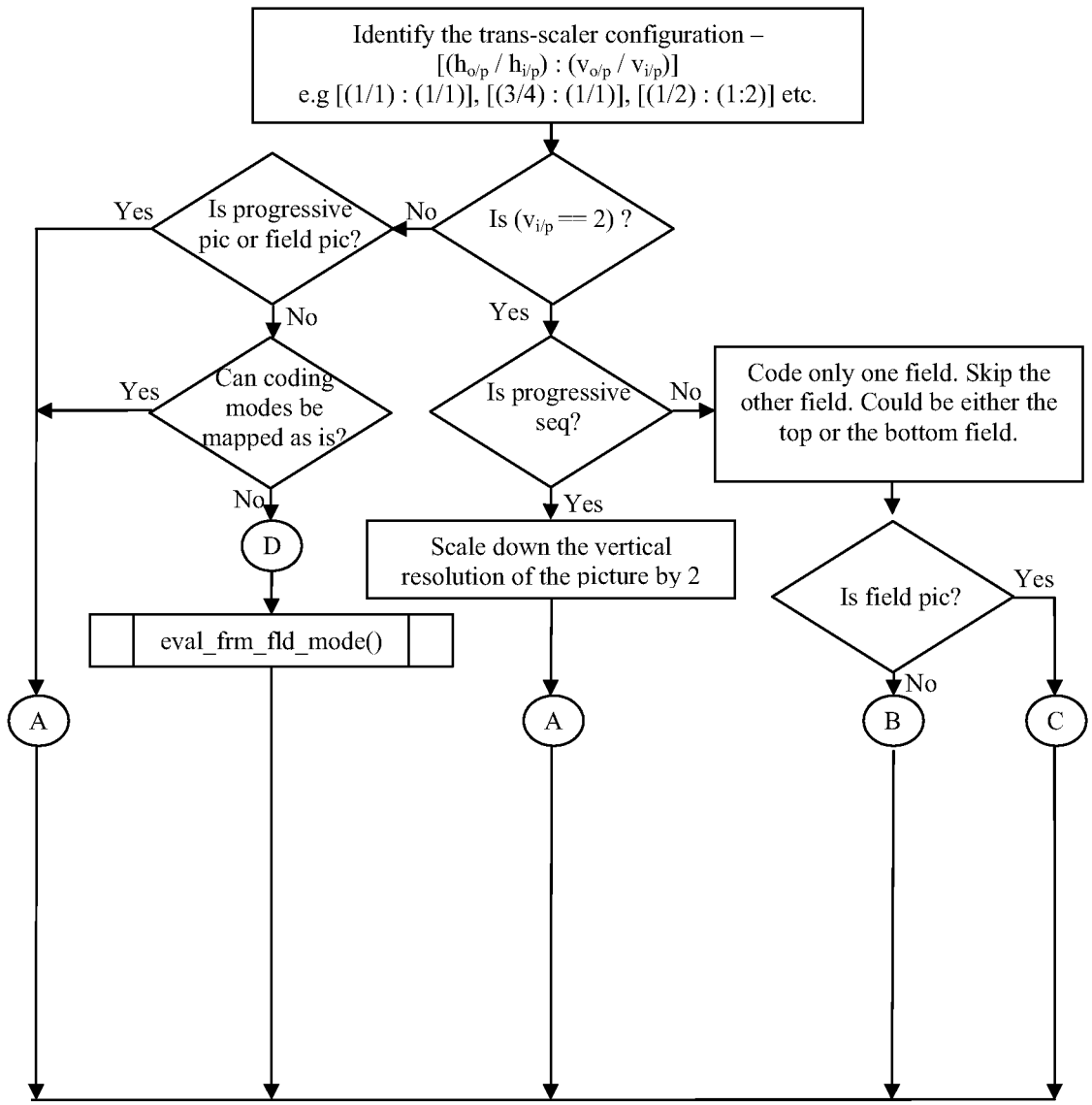
FIG. 10 shows the top-level flow of the trans-coder to map the MB level information from the input to the output picture under different trans-scaler configurations and for different picture types—progressive frame/interlaced frame and field pictures.

As shown in FIG. 10, this complexity in coding the interlaced frame picture sequence does not arise if the information from the input stream can be mapped as is (accurately) without any modification in the H.264 format. Information from the input stream can be mapped accurately in the H.264 stream if all the input MBs that map to the top MB in the MB pair are coded similarly (say coding_mode$_{top\_mb}$) and all the input MBs that map to the bottom MB in the MB pair are coded similarly (say coding_mode$_{bottom\_mb}$) and the coding modes—coding_mode$_{top\_mb}$ and coding_mode$_{bottom\_mb}$ are mentioned as coding mode combination in Table-1.

TABLE 1

Coding mode combinations for input MBs that map to the top and the bottom MB of a single output MB pair that ensures an accurate mapping from the input to the output.

| Coding mode of all input MBs that map to a top MB in the output MB pair | Coding mode of all input MBs that map to a bottom MB in the output MB pair |
| --- | --- |
| Intra Frame prediction mode | Intra frame prediction mode |
|  | Inter frame prediction mode |
| Intra field prediction mode | Intra field prediction mode |
| Inter frame prediction mode | Inter frame prediction mode |
|  | Intra frame prediction mode |
| Inter field prediction mode | Inter field prediction mode |

Figure 14:
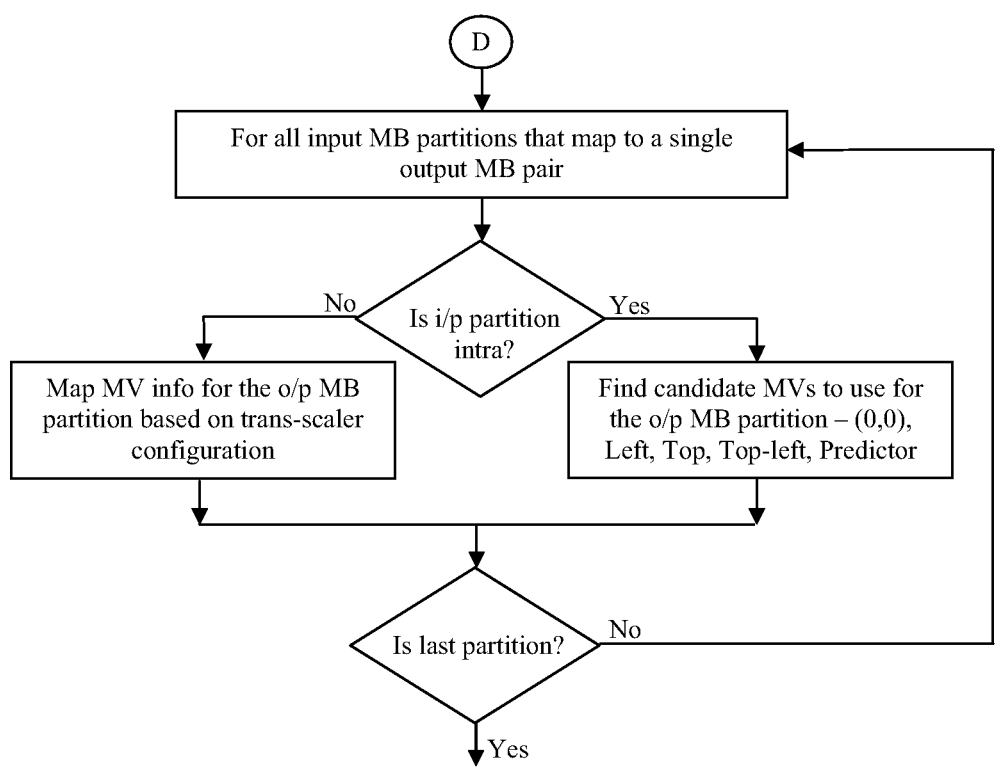
FIG. 14 shows the flow of the mapping stage to map the MB level information from the input to the output picture, in the case of an interlaced frame picture when it is known that the MB level information from the input picture can not be accurately mapped to the output picture, considering that this mapping is temporary in nature and the final modes are selected using the flow shown in FIG. 15.
Figure 15:
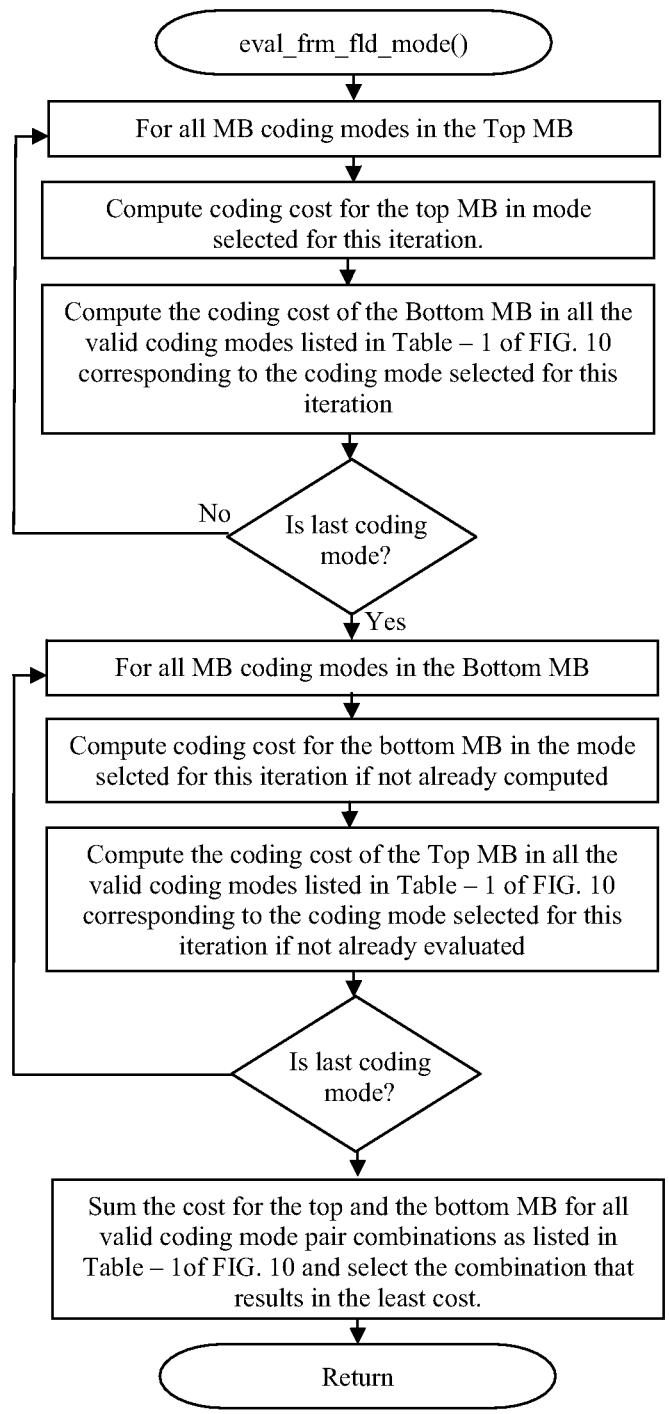
FIG. 15 shows the flow of the mapping stage to decide on the final coding modes for MBs in an interlaced frame picture when it is known that the MB level information from the input picture can not be accurately mapped to the output picture.

If that is not the case, the trans-coder computes the cost of coding the MB in several different modes and selects the mode that results in the least coding cost. As shown in FIG. 14, the trans-coder first maps the MB coding modes to the output H.264 MB partitions based on the trans-scaler configuration. As shown in FIG. 15, the trans-coder then makes a list of all the different MB coding modes that got mapped to a single output MB pair in the process. The trans-coder needs to select one of these modes to code the output MB pair in. To do so, the trans-coder runs a loop on all the MB coding modes that have been mapped from the input stream to the top MB of the output MB pair. The trans-coder computes the cost of coding the top MB in that particular mode and the bottom MB in all the valid MB coding modes listed in Table-1 corresponding to the coding mode selected for this loop iteration. Similarly it runs a loop on all the MB coding modes that have been mapped from the input stream to the bottom MB of the output MB pair and computes the cost of coding the bottom MB in that particular mode and the top MB in all the valid MB coding modes listed in Table-1 corresponding to the coding mode in which the bottom MB is being evaluated. The trans-coder avoids any duplicate cost computation by checking if the top or the bottom MB has been evaluated in a particular mode already. Once the cost of all the valid MB coding modes has been evaluated for the top and the bottom MB in the pair, the trans-coder sums up the cost for the top and the bottom MB for all valid MB coding mode pair combinations and selects the mode that results in the least cost. The output MB pair is then coded in this mode (field/frame) in the H.264 stream.

Tables 2-5 below are expediently used to map information from the input stream to the output stream. In particular, Table-2 relates to the interframe coding mode, Table-3 relates to the interfield coding mode, Table-4 relates to the intraframe coding mode and Table 5 relates to the intrafield coding mode. These tables 2-5 are used by the trans-coder to decide the steps required to convert the MBs from one mode in H.264 to the other coding mode in H.264 in the case of an interlaced frame picture.

TABLE 2

Steps required to convert the information from the original MB coding mode to the inter frame coding mode:

| Idx | Original MB coding mode | Steps required to convert the information from the original MB coding mode to the Inter frame coding mode |
| --- | --- | --- |
| 1 | Inter frame prediction | — |
| 2 | Intra frame prediction | Compute frame MV candidates from the neighboring left, top, top-left 4 × 4 MB partitions besides the (0, 0) and the predictor MV and select the MV that results in the lest cost |
| 3 | Inter field prediction | Select the MV that results in the best cost among all the MVs mentioned in #2. and the two field MVs that have been mapped from the input stream after they are converted to frame units. |
| 4 | Intra field prediction | Same as in #2. |

TABLE 3

Steps required to convert the information from the original MB coding mode to the inter field coding mode:

| Idx | Original MB coding mode | Steps required to convert the information from the original MB coding mode to the Inter field coding mode |
| --- | --- | --- |
| 1 | Inter field prediction | — |
| 2 | Intra field prediction | Compute field MV candidates from the neighboring left, top, top-left 4 × 4 MB partitions besides the (0, 0) and the predictor MV and select the MV that results in the lest cost |

TABLE 3-continued

Steps required to convert the information from the original MB coding mode to the inter field coding mode:

| Idx | Original MB coding mode | Steps required to convert the information from the original MB coding mode to the Inter field coding mode |
| --- | --- | --- |
| 3 | Inter frame prediction | Select the MV that results in the best cost among all the MVs mentioned in #2. and the frame MV that has been mapped from the input stream after converting it to field units. |
| 4 | Intra frame prediction | Same as in #2. |

TABLE 4

Steps required to convert the information from the original MB coding mode to the intra frame coding mode:

| Idx | Original MB coding mode | Steps required to convert the information from the original MB coding mode partition to the Intra frame coding mode |
| --- | --- | --- |
| 1 | Inter field prediction | Evaluate the cost of coding the MB as an intra 16 × 16 and an intra 4 × 4 frame MB and select the mode (16 × 16 or 4 × 4) that results in the least cost. |
| 2 | Intra field prediction | |
| 3 | Inter frame prediction | |
| 4 | Intra frame prediction | |

TABLE 5

Steps required to convert the information from the original MB coding mode to the intra field coding mode:

| Idx | Original MB coding mode | Steps required to convert the information from the original MB coding mode to the Intra field coding mode |
| --- | --- | --- |
| 1 | Inter field prediction | Evaluate the cost of coding the MB as an intra 16 × 16 and an intra 4 × 4 field MB and select the mode (16 × 16 or 4 × 4) that results in the least cost. |
| 2 | Intra field prediction | |
| 3 | Inter frame prediction | |
| 4 | Intra frame prediction | |

Figure 11:
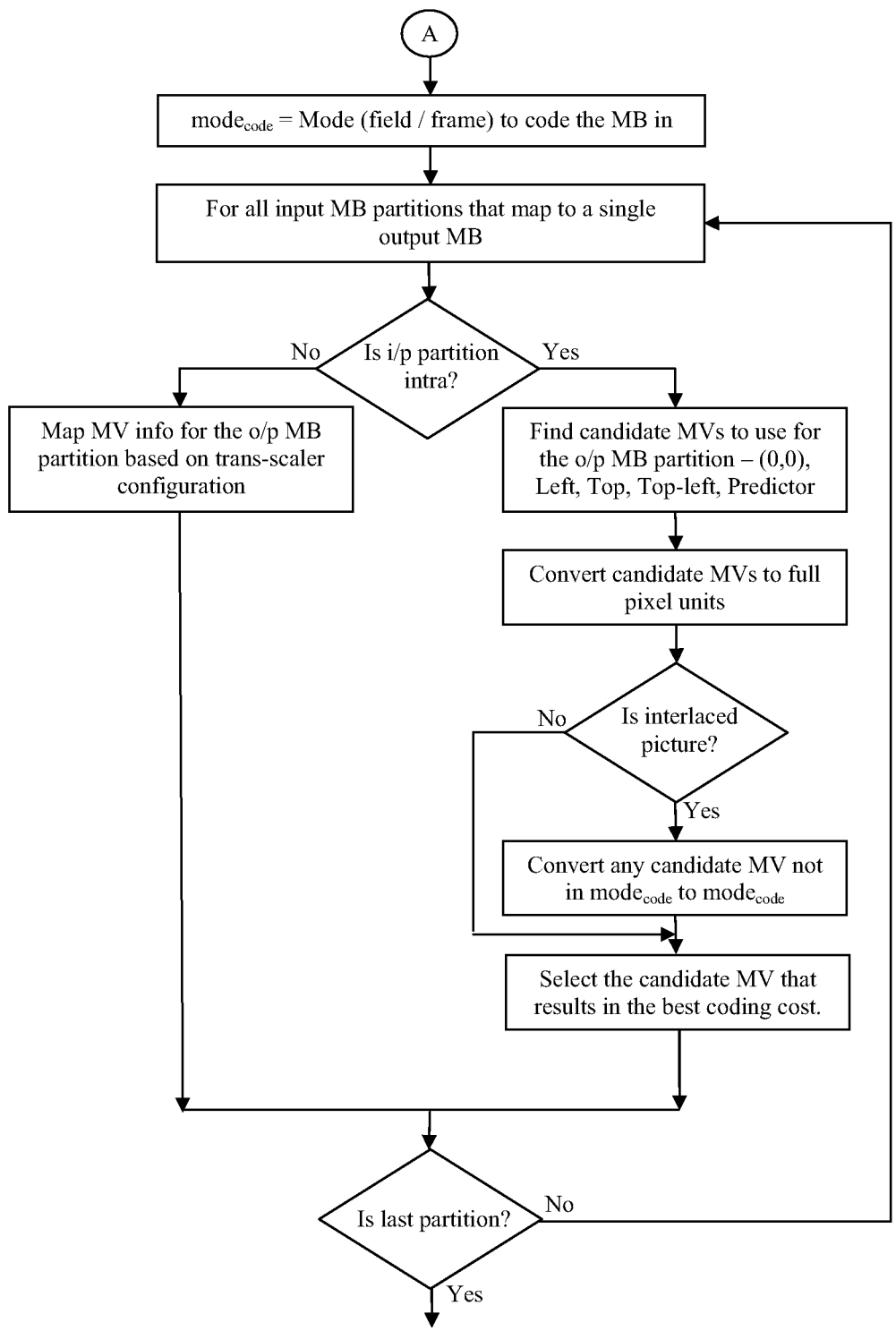
FIG. 11 shows the flow of the mapping stage to map the MB level information from the input to the output picture when the input picture is either a progressive frame picture or when the input picture of type field and is not being vertically down-scaled.

Again as shown in FIG. 10, when the picture is not being down-scaled vertically, it is relatively simple to accurately map the MV information for a progressive or a field picture. For an interlaced frame picture too, when the input picture is not being down-scaled vertically, when coding_mode$_{top\_mb}$ and coding_mode$_{bottom\_mb}$ are mentioned as valid coding mode combinations in Table-1, mapping the information from the input stream to the output stream is relatively simple. For these cases, as shown in FIG. 11, the code loops over all input MB partitions that map to a single MB in the case of a progressive or a field picture or a MB pair in the case of an interlaced frame picture, to ascertain if the MB partition is a part of an intra MB in the input picture. If it is, the input bit stream does not give any information to temporally predict the output MB partition to which it maps. To avoid being forced to code the entire MB as an intra MB because some partitions could not derive information to temporally predict themselves, the re-encoder calculates a few candidate MVs—namely the (0,0) MV, the MV from the neighboring left, top, top-left 4×4 MB partitions and the predictor MV. These candidate MVs are converted to full pixel units and in the case of an interlaced frame picture, if required, is converted to the mode in which the MB would be coded. The candidate MV with the least coding cost is selected as the final MV for the output MB partition. If however, the input MB partition does not belong to an intra MB in the input stream the re-encoder maps the MV information to an output MB partition after scaling it according to the trans-scaler configuration.

The re-encoder codes only half the vertical resolution of the input picture when the picture is being down-scaled by a factor of 2. For a progressive picture the trans-scaler is configured to down-scale the vertical resolution of the picture by 2. For an interlaced frame picture or a field picture the trans-scaler is not used to scale the vertical resolution. Instead, the trans-coder codes only one field (top/bottom) skipping the other.

As shown in FIG. 10, for a progressive sequence in this particular case the algorithm used to map the MV information remains the same as in the case where the vertical resolution is not being down-scaled, noting that the number of input MB partitions that map to a single output MB will change because of the different trans-scaler configuration.

Figure 13:
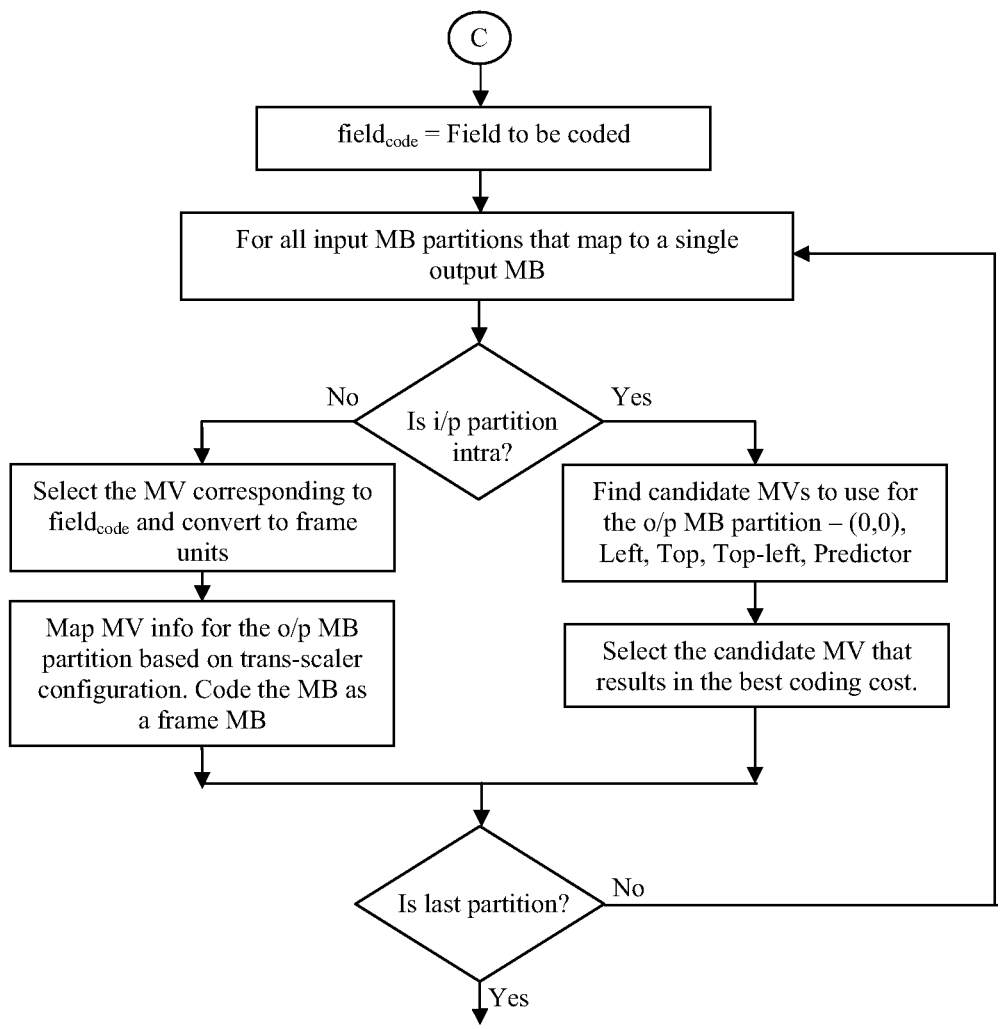
FIG. 13 shows the flow of the mapping stage to map the MB level information from the input to the output picture when the input picture is a field type and is being vertically down-scaled by a factor of 2.

For a field picture, once the second field is eliminated, the picture generated using just the first field can be viewed as a progressive frame picture with half the vertical resolution. Hence in this particular case the first field picture (top/bottom) in the input sequence is coded as a frame picture in the output sequence with half the vertical resolution. Referring to FIG. 13, for input MB partitions that belong to an inter MB in the input stream, the MVs corresponding to the first field are selected, converted to frame units and scaled according to the trans-scaler configuration before mapping them to the corresponding output MB partition. As before, the re-encoder calculates candidate MVs for those output MB partitions that derive their MVs from intra MBs in the input stream. Since the candidate MVs are computed from the neighboring MBs in the output stream they are already stored in the frame units and hence no mode conversion is required. The candidate MV resulting in the least coding cost is selected as the final MV for the output MB partition.

Figure 12:
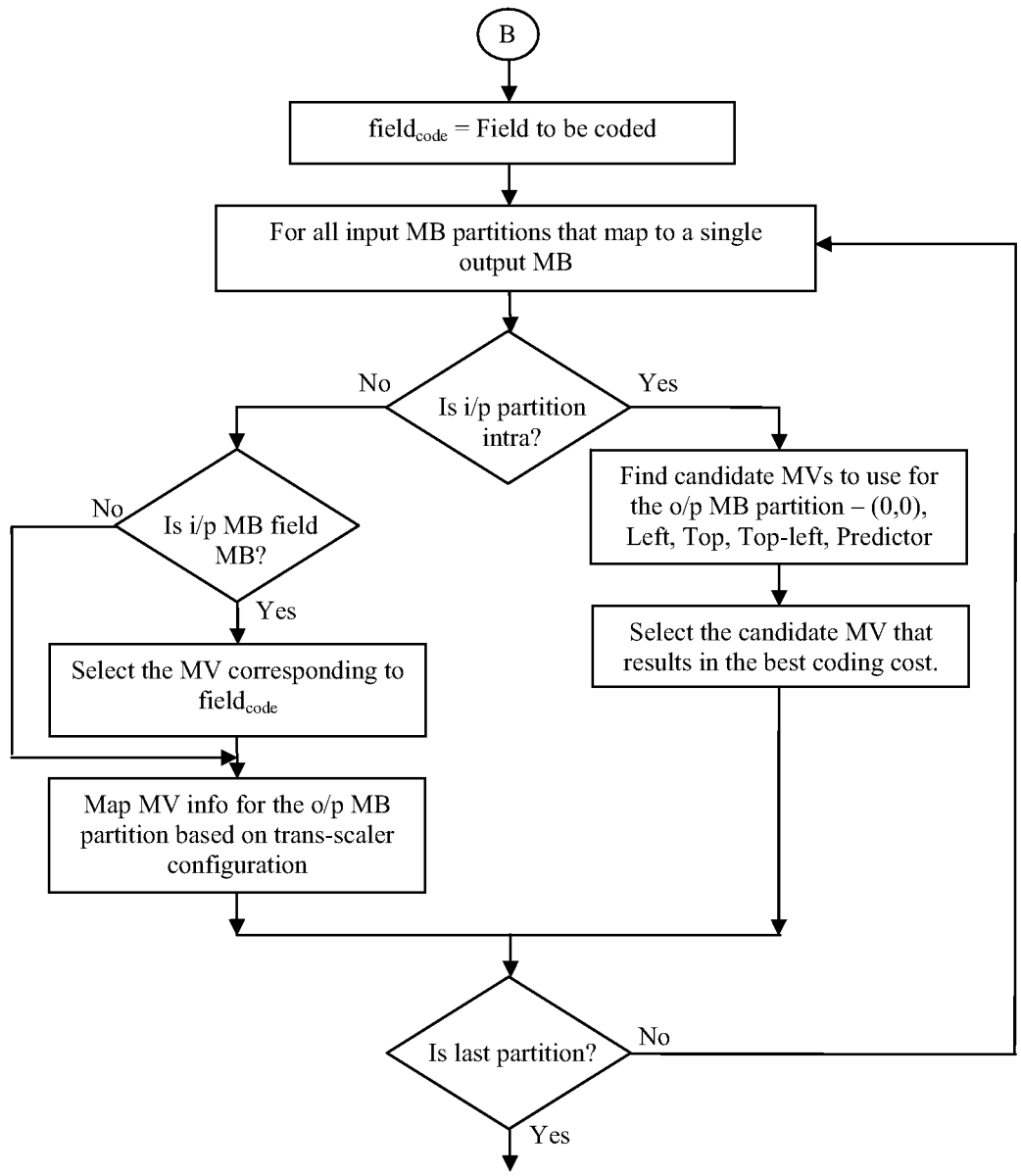
FIG. 12 shows the flow of the mapping stage to map the MB level information from the input to the output picture when the input picture is an interlaced frame picture type and is being vertically down-scaled by a factor of 2.

For an interlaced frame picture sequence too, just one field (top/bottom) is coded. In this case also, the output picture is coded as a frame picture. As shown in FIG. 12, for all MBs in the input stream that map to partitions of a single MB in the output stream, the re-encoder checks whether or not the MB partition belongs to an intra MB in the input stream. If it does, as before the re-encoder calculates candidate MVs from neighboring left, top, top left 4×4 MB partitions in the output picture, the predictor MV besides the (0, 0) MV. Since the candidate MVs are derived from MB partitions in the output picture, they would be already stored in frame units and hence would not require any mode-conversion. The candidate MV resulting in the least coding cost is selected as the final MV for the output MB partition. If the input MB is not an intra MB, it is checked if it is coded in the field or the frame mode. If it is coded in the frame mode the MV information is mapped to the output MB partition after scaling them according to the trans-scaler configuration. Else, the MV corresponding to the top field is chosen, converted into frame units, scaled according to the trans-scaler configuration and then mapped to the output MB partition.

MVs in the MPEG-2 are mentioned in half pixel accuracy units. MVs in MPEG4 stream can be mentioned in either half or quarter pixel accuracy. MVs in H.264 are coded with quarter pixel accuracy. The MV information are mapped to the H.264 format, based on the trans-scaler configuration, the accuracy with which the MVs are mentioned in the input stream and whether or not they need to be converted from the frame to the field mode or vice-versa.

MPEG-4 quarter pixel accurate MVs are actually mentioned in half pixel units with a fractional component. MPEG-2 MVs are mentioned in half pixel units. The half pixel unit MVs are first converted to quarter pixel unit MVs using the following equation:

$$\text{quarter\_pel\_mv}(x) = \text{half\_pel\_mv}(x) << 1$$

$$\text{quarter\_pel\_mv}(y) = \text{half\_pel\_mv}(y) << 1 \quad \text{Eq (I)}$$

These quarter pixel MVs are then approximated to the nearest half pixel location using the following equation:

$$\text{quarter\_pel\_mv\_appx\_to\_half\_pel}(x) = ((\text{quarter\_pixel\_mv}(x)+1)\&0xFFFE)$$

$$\text{quarter\_pel\_mv\_appx\_to\_half\_pel}(y) = ((\text{quarter\_pixel\_mv}(y)+1)\&0xFFFE). \quad \text{Eq (II)}$$

When the trans-scaler is configured in mode I, MVs from the input stream are first converted to quarter pixel units using Eq (I) and Eq (II):

$$h264\_\text{quarter\_pel\_mv}(x) = \text{quarter\_pel\_mv\_appx\_to\_half\_pel}(x)$$

$$h264\_\text{quarter\_pel\_mv}(y) = \text{quarter\_pel\_mv\_appx\_to\_half\_pel}(y). \quad \text{Eq (III)}$$

When the trans-scaler is configured in mode II, H.264 MVs are derived from half pixel accurate MVs derived using Eq (I) and Eq (II) follows:

$$h264\_\text{quarter\_pel\_mv}(x) = [(\text{quarter\_pel\_mv\_appx\_to\_half\_pel}(x)*3+2)>>2]\&0xFFFE$$

$$h264\_\text{quarter\_pel\_mv}(y) = \text{quarter\_pel\_mv\_appx\_to\_half\_pel}(y). \quad \text{Eq (IV)}$$

When the trans-scaler is configured in mode III, H.264 MVs are derived from the half pixel accurate MVs derived using Eq (I) and Eq (II) as follows:

$$h264\_\text{quarter\_pel\_mv}(x) = [(\text{quarter\_pel\_mv\_appx\_to\_half\_pel}(x)*4+3)/6]\&0xFFFE$$

$$h264\_\text{quarter\_pel\_mv}(y) = \text{quarter\_pel\_mv\_appx\_to\_half\_pel}(y). \quad \text{Eq (V)}$$

When the trans-scaler is configured in mode IV, H.264 MVs are derived from the half pixel accurate MVs using Eq (I) and Eq (II) as follows:

$$h264\_\text{quarter\_pel\_mv}(x) = ((\text{quarter\_pel\_mv\_appx\_to\_half\_pel}(x)+1)>>1)\&0xFFFE$$

$$h264\_\text{quarter\_pel\_mv}(y) = \text{quarter\_pel\_mv\_appx\_to\_half\_pel}(y). \quad \text{Eq (VI)}$$

When the trans-scaler is configured in mode V, H.264 MVs are derived from half pixel accurate MVs using Eq (I) and Eq (II) as follows:

$$h264\_\text{quarter\_pel\_mv}(x) = ((\text{quarter\_pel\_mv\_appx\_to\_half\_pel}(x)+1)>>1)\&0xFFFE$$

$$h264\_\text{quarter\_pel\_mv}(y) = ((\text{quarter\_pel\_mv\_appx\_to\_half\_pel}(y)+1)>>1)\&0xFFFE. \quad \text{Eq (VII)}$$

Once mapped to the H.264 format, conversion of field mode MVs in quarter pixel units to frame mode in quarter pixel units is done using the following equation:

$$\text{quarter\_pel\_mv}(x) = \text{quarter\_pel\_mv}(x) \quad -\text{Eq (VIII)}$$

$$\text{quarter\_pel\_mv}(y) =$$

$$\begin{cases} \text{arter\_pel\_mv}(y) >> 2) << 3 & \text{If current and reference fields are of the same parity} \\ \text{rter\_pel\_mv}(y) >> 2) << 3) - 4 & \text{If bottom field refers to the top field} \\ \text{rter\_pel\_mv}(y) >> 2) << 3) + 4 & \text{If top field refers to the bottom field} \end{cases}$$

Similarly, once mapped to the H.264 format, conversion of the frame mode MVs to field mode MVs is done using the following equation:

$$\text{quarter\_pel\_mv}(x) = \text{quarter\_pel\_mv}(x)$$

$$\text{quarter\_pel\_mv}(y) = (\text{quarter\_pel\_mv}(y) >> 3) << 2 \quad \text{Eq (IX)}$$

Figure 16:
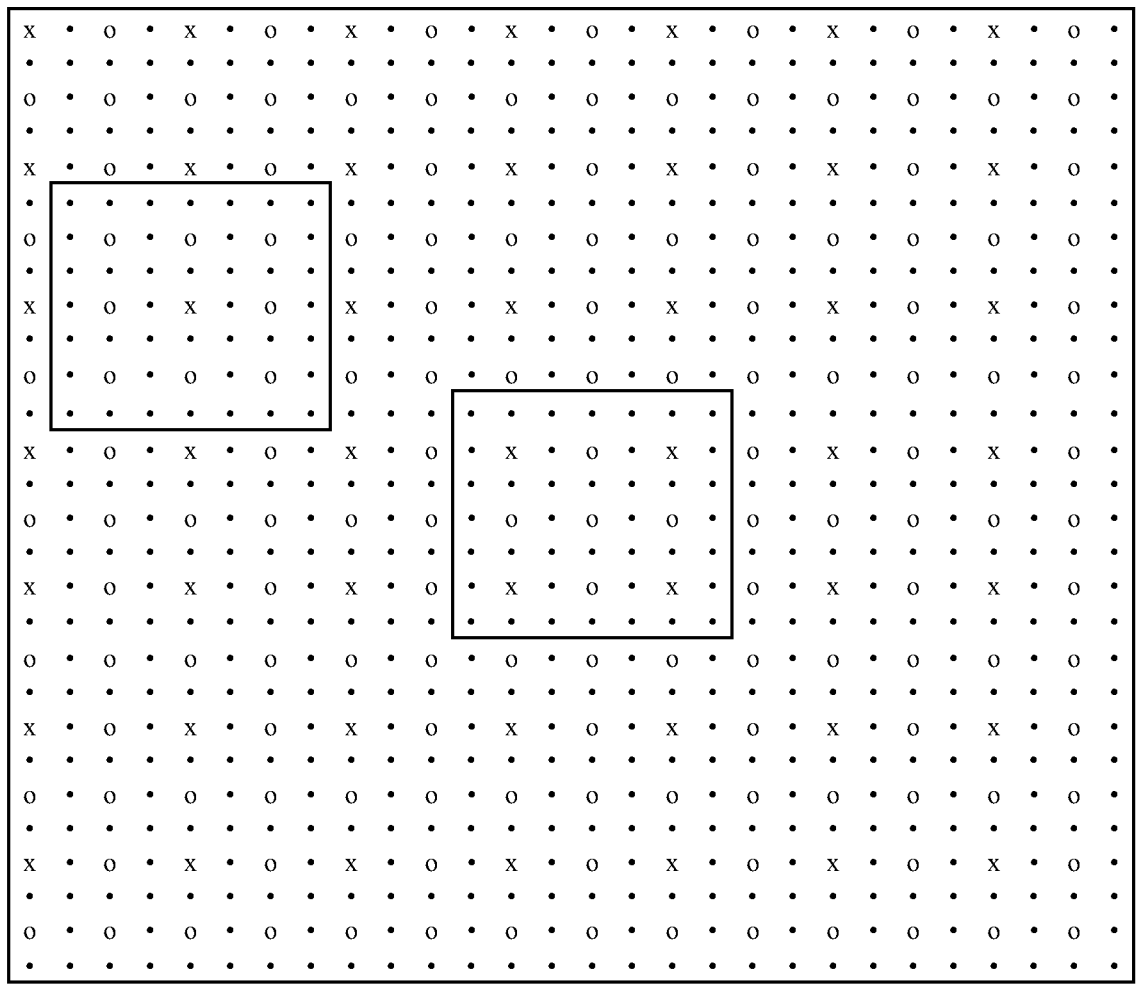
FIG. 16 shows the pixel grid that is searched during the MV refinement stage.

MV Refinement:

FIG. 16 illustrates the grid that is searched during the MV refinement stage (block 206) for a MB partition. FIG. 16 depicts two search windows, one when the pixel around which the search is centered is a full pixel location, and the other when the pixel around which the search is centered is a half pixel location.

In FIG. 16, pixel locations marked "x" correspond to full pixel locations; "o" correspond to half pixel locations; "•" correspond to quarter pixel locations.

The MV refinement stage (block 206) computes the cost of coding the MB partition at the closest half pixel location derived from the mapping stage. Quarter pixel accurate MVs computed for temporally predicting intra MBs in the input picture are approximated to the closest half pixel location for the purpose of refinement. Centered around this half pixel location, it then searches in a window that may span outside the boundaries of the picture for a full pixel location that results in a lesser coding cost. The MV associated with the least coding cost (say $MV_{center}$) is used as the center pixel for subsequent sub pixel refinements.

The trans-coder searches a square grid (marked "green") spaced at a distance of one half pixel unit around $MV_{center}$. FIG. 16 shows the windows that may be searched during the sub pixel refinement depending upon where the $MV_{center}$ (marked "yellow") points to a full pixel or a half pixel location. The half pixel location that results in the best cost (any of the pixels marked "green" or "yellow") is then used as the center pixel to evaluate quarter pixels (any of the "blue" pixels) by searching on a quarter pixel square grid spaced at a distance of one quarter pixel unit from the center half pixel. Using this process the sub-pixel refinement stage could refine the MVs by ±0.75 pixels in either direction around $MV_{center}$. Starting from $MV_{center}$ (marked "yellow") the search could result in any of the locations within the bounding rectangle to be selected.

Figures 17, 18:
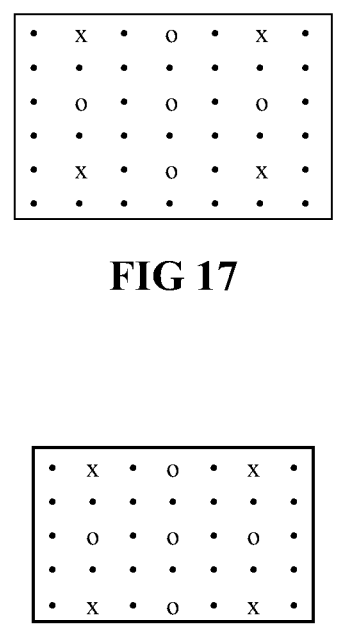

FIG. 17 illustrates how the half-pixel search during the sub-pixel refinement stage is optimized. The half pixel refinement search is expediently split into two layers. During layer I search, starting from $MV_{center}$ (marked "yellow") the coding cost is computed for each of the corner half-pixels on a square grid (marked "blue"). Coding cost for the half-pixels on the diamond gird (marked "green") is estimated by interpolating (averaging) the coding cost of the nearest two half-pixels that were evaluated in layer 1. Coding cost for the half-pixel on the diamond grid associated with the least interpolated cost is computed in layer II search. The half-pixel location associated with the least coding cost is used for centering the search on the quarter pixel grid.

FIG. 18 shows how the quarter-pixel search during the sub-pixel refinement stage may be optimized. As in the half pixel refinement search, the quarter pixel refinement search also is split into two layers. During layer I search, starting from the center pixel (marked "yellow") the coding cost is computed for each of the corner quarter-pixels on a square grid (marked "blue"). Coding cost for the quarter-pixels on the diamond gird (marked "green") is estimated by interpolating (averaging) the coding cost of the nearest two quarter-pixels that were evaluated in layer 1. Coding cost for the quarter-pixel on the diamond grid associated with the least interpolated cost is computed in layer II search. The quarter-pixel location associated with the least coding cost is selected as the final MV for the MB partition being evaluated.

This step is repeated for all partitions into which a MB is divided during the mapping stage.

It should be noted here that while the MPEG-2 standard does not allow unrestricted motion estimation, the trans-coder makes use of unrestricted motion estimation during the sub-pixel refinement stage, while evaluating the skip mode of coding and while converting intra MBs to inter MBs.

Complexities introduced by trans-scaling and the differences between the two standards result in finer MB partitions and also different and multiple MVs to be evaluated for each MB partition. These multiple evaluations require a lot of data to be fetched from the external memory which is typically much slower than the processor clock. Optimizing accesses to the external memory hence optimizes the overall system. To do so, DMA (Direct Memory Access) is often employed to fetch data from the external to the internal memory where the internal memory works at a much faster speed. Configuring and triggering DMAs consume processor cycles and doing so multiple numbers of times for each individual partition consumes even more cycles. To optimize the number of DMAs that need to be triggered, the trans-coder fetches an area centered around a MB. The bounding rectangle is defined by the amount of internal memory that can be spared for the search area and by the typical range of MVs that the trans-coder might expect to encounter in the input stream. The typical range of MVs that the trans-coder expects to encounter in the input stream is derived intuitively by considering the application in which the trans-coder is to be used, and by considering the f_code parameter in the input stream. The f_code parameter in the input stream puts a constraint on the range of MVs in the input stream. Pixel data that lie outside of this area and are required by some MVs are then fetched individually by configuring and triggering a separate DMA.

Transrating:

Rate control is done in the feedback loop from the output of the entropy coder (block 210) to the H.264 coding engine (block 209) as shown in FIG. 2. The trans-rater (block 208) computes the quantizer scale at the picture and the MB level to meet the target output bit rate. The trans-rater uses the following information from the MPEG-2 stream to decide on the quantizer scale:

Initial buffer fullness,
Average bit rate at which the MPEG-2 stream has been encoded,
SAD (Sum of Absolute Differences) at the picture and the MB level,
Syntactical and the residual bits used at the picture and the MB level,
Average quantizer scale used over the picture, and,
Number of intra MBs in the input picture.

Information like the SAD, and the number of intra MBs that are collected at the picture level in the input stream are used to decide whether or not a scene change occurred in the sequence. The scene change information is critical for the trans-rater (block 208) to shape the VBV (Video Buffer Verifier) trajectory so as to avoid any trans-coder buffer underflow.

The SAD, the number of bits used for the picture and the average quantizer used over the picture is used by the trans-rater (block 208) to judge the complexity of the current picture to be coded and allocate bits to it.

The SAD, the number of bits and the quantizer scale information at the MB level are used to judge the complexity of the MB to decide on the distribution of bits over the MBs in the picture.

If required the Transcoder can be configured to closely track the VBV trajectory of the input MPEG-2/MPEG-4 stream.

Similar to a rate-control engine (block 106), the trans-rater (block 208) is benefited by knowing the coding type and the complexity of the pictures in the input stream in advance. In systems where a low-latency between the input and the output is not a requirement, the input stream is parsed in advance to know the picture coding types and the bits used on each one of them Once the trans-coder begins decoding (block 201) and encoding (block 203) the input stream, this advance information helps the trans-rater (block 208) shape the VBV trajectory. The trans-coder ensures that the input stream is parsed in advance so that the collected information could be made use of later while trans-coding.

In systems where a low-latency between the input and the output stream is desired, the trans-rater (block 208) maintains a histogram of the different GOP (Group Of Pictures) structures it has encountered over a sliding window of the last 16 GOP periods. The bin with the largest hit count is assumed to be the GOP structure for the next GOP to be coded. This helps the trans-rater (block 208) arrive at a reasonably good estimate of the GOP structure—the number of I, P, B pictures, the GOP duration and the sub GOP length which helps it shape the VBV trajectory to look close to the one in the input stream.

Besides the GOP structure the trans-rater gets more real-time feedback on the sub GOP structure (PBB) by decoding the temporal-reference syntax element. This helps the trans-rater know the number of B pictures that follow a P picture which helps the trans-rater shape the VBV trajectory and also delay or avoid the skip of a reference picture (P) by skipping the non-reference picture.

Error Handling:

The trans-coder needs to be resilient to errors in the input picture. The decoder (block 201) while decoding the input stream expediently checks the bounds and the constraints imposed on all syntactical elements of the stream to decide if the input picture was in error. This error information is sent to the error handling engine (block 214) which takes the necessary steps based upon the severity of the error determined by the information in the stream that got corrupted. Errors in the input stream are categorized as either critical or non-critical.

Information in the MPEG-2/MPEG-4 stream can be broadly classified into two types—header information and picture data information. Information such as the sequence header, the GOP header and the picture header all fall into the header information category. Information used to decode the MB in the input picture fall into the picture data category. An error in the header information is considered critical. Error in the picture data information of a reference picture is again considered critical whereas the same kind of an error in a non-reference picture is not considered critical.

When the trans-coder encounters a critical error, it only decodes the incoming stream without encoding the pictures. It resumes encoding as soon as it finds an I picture or decodes around 0.5 sec of video without encountering any error. The encoder only inserts stuffing bits during this interval if the encoder buffer is going to underflow.

When the trans-coder encounters a non-critical error, it skips coding the current picture and inserts stuffing bits if necessary. The trans-coder then resumes encoding from the next picture.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. The description is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled.

The invention claimed is:

1. A system for transcoding an input first video format including one of H.261/MPEG-1/H.263/MPEG-2/MPEG-4 to a H.264 video format, comprising:
   a decoder capable of decoding the first video format including the one of H.261/MPEG-1/H.263/MPEG-2/MPEG-4 and identifying certain data in the input first video format that can be re-used in the H.264 video format;
   a re-encoder capable of producing an output stream conforming to the H.264 video format with a mapping module for mapping said certain identified data from said first video format to corresponding semantic equivalents allowed by said H.264 video format; and
   a scaling module inserted between said decoder and said re-encoder to scale the output of said decoder and provide it as input to said re-encoder, wherein said mapping module is further configured to arrive at a suitable set of motion compensation partitions in said H.264 video format by suitably mapping said certain identified data from said first video format to the corresponding semantic equivalents allowed by said H.264 video format subject to a downscaling ratio of 2:1, 4:3 or 3:2 in a horizontal direction and without scaling in a vertical direction.

2. The system as in claim 1, wherein said certain identified data comprises motion vectors including macroblock type, motion compensation type, and transform coding type of a coding unit in said first video format.

3. The system as in claim 1, wherein an additional processing stage is inserted in between said decoder and said re-encoder.

4. The system as in claim 3, wherein said additional processing stage is a post-processing module that reduces coding artifacts present in an output of said decoder and provides that as input to said re-encoder.

5. The system as in claim 3, wherein said additional processing stage comprises a post-processing module that de-interlaces an output of said decoder and provides that as input to said re-encoder.

6. The system as in claim 3, wherein said additional processing stage includes a module that reduces coding artifacts present in an output of said decoder and a scaling module that downscales said artifact reduced output and provides as input to said re-encoder.

7. The system as in claim 2, wherein said first video format encodes macroblocks in raster scan order and said H.264 video format encodes a pair of vertically adjacent macroblocks one after the other and then proceeds to a next pair in raster scan order.

8. The system as in claim 7, wherein said mapping module further evaluates whether to code a pair of macroblocks in the H.264 video format as a frame macroblock pair or a field macroblock pair using said certain identified data in said input first video format, wherein in coding the pair of macroblocks in the H.264 video format as a frame macroblock pair, an inter-macroblock is coded with frame motion compensation and the motion compensated residual blocks are coded with a frame transform and an intra macroblock is coded with a frame transform, and wherein in coding the pair of macroblocks in the H.264 video format as a field macroblock pair, an inter-macroblock is coded with field motion compensation and the motion compensated residual blocks are coded with a field transform and an intra macroblock is coded with a field transform.

9. The system as in claim 8, wherein said re-encoder includes an additional module to refine the mapped motion vectors on a full pixel and/or fractional pixel accuracy and includes motion vector positions that may point outside a coded reference picture boundary.

10. The system in claim 8, wherein said mapping module optionally converts intra-coded macroblocks with either field or frame transform of the blocks in said first video format to a frame or field transform of the blocks respectively in said H.264 video format.

11. The system as in claim 8, wherein said mapping module optionally converts intra-coded macroblocks with either field or frame transform of the blocks in said first video format to frame motion compensated partitions with frame transform of the residual blocks or field motion compensated partitions with field transform of the residual blocks in said H.264 video format.

12. The system in claim 2, wherein said re-encoder includes a trans-rating unit which can change bit rate of the output bit stream in said H.264 video format over a wide range.

13. The system as in claim 12, wherein the certain identified data includes computed sum of absolute values of residuals at a frame and block level on said first video format, and wherein said trans-rating unit utilizes said frame and block level sum of absolute values of residuals to perform macroblock level bit allocation.

14. The system as in claim 12, wherein the tran-rating unit is configured to optionally prevent a hypothetical reference decoder's buffer from underflowing, by skipping a non-reference picture that follows a reference picture in the encoding order when the underflow was imminent while first attempting to code said reference picture.

15. The system as in claim 8, wherein said re-encoder includes a transrating unit which can change bit rate of the output stream in said H.264 video format over a wide range.

16. The system in claim 1 including error handling capability in the decoder and re-encoder, wherein, if there is an error in said first video input format, said error handling capability will generate a syntactically correct error-free output from said re-encoder.

17. A method of transcoding an input first video format including one of H.261/MPEG-1/H.263/MPEG-2/MPEG-4 to a H.264 video format comprising the steps of:
  decoding said first video format including the one of H.261/MPEG-1/H.263/MPEG-2/MPEG-4 in a decoder and identifying certain data in said first video format that could be used in the H.264 video format;
  scaling the output of said first video format by a scaling module using a downscaling ratio of 2:1, 4:3 or 3:2 in a horizontal direction and without scaling in a vertical direction; and
  re-encoding the scaled output in a re-encoder with help from a mapping module for producing an output video stream conforming to said H.264 video format, wherein said mapping module is further configured to arrive at a suitable set of motion compensation partitions in said H.264 video format by suitably mapping said certain identified data from said first video format to corresponding semantic equivalents allowed by said H.264 video format subject to the horizontal and vertical scaling ratios used by said scaling module.

18. The method as in claim 17, wherein said certain identified data comprises motion vectors including macroblock type, motion compensation type, and transform coding type of a coding unit in said first video format.

19. The method as in claim 18, wherein an additional processing stage is inserted in between said decoder and said re-encoder.

20. The method as in claim 17, including the step of MV refinement, wherein MV refinement partitions in implementation are selectively different from mapped syntactically allowed partitions.

21. The method as in claim 17, including the step of selectively changing bit rate by using a trans-rating unit.

22. The method as in claim 17, including the step wherein half pixel accuracy motion vectors from said first video format are taken and refined to obtain quarter pixel accuracy motion vectors.

23. The method as in claim 17 wherein the input video format relates to a picture, the method including the step of inferring scene cuts in the input first video format from a number of intra macroblocks in the picture.

24. The method as in claim 23, including the step wherein, from the inferred scene cuts, suitably converting an inter picture to an intra picture.

25. The method as in claim 17, including the step of maintaining, to reduce memory bandwidth, a central search area that is updated regularly for every macroblock and if a mapped motion vector or refinement range does not fall within the central search area, only then transferring additional reference areas.

26. The method as in claim 17, including the step of using specific picture level information for trans-rating.

27. A non-transitory computer readable medium encoded with data/instruction which when executed by a computing platform, results in execution of a method of transcoding an input first video format including one of H.261/MPEG-1/H.263/MPEG-2/MPEG-4 to a H.264 video format comprising the steps of:
  decoding said first video format including the one of H.261/MPEG-1/H.263/MPEG-2/MPEG-4 in a decoder and identifying certain data in said first video format that could be used in the end H.264 video format;

scaling the output of said first video format by a scaling module using a downscaling ratio of 2:1, 4:3 or 3:2 in a horizontal direction and without scaling in a vertical direction; and re-encoding the scaled output in a re-encoder with help from a mapping module for producing an output video stream conforming to said H.264 video format, wherein said mapping module is further configured to arrive at a suitable set of motion compensation partitions in said H.264 video format by suitably mapping said certain identified data from said first video format to corresponding semantic equivalents allowed by said H.264 video format subject to the horizontal and vertical scaling ratios used by said scaling module, and wherein said certain identified data comprises motion vectors including macroblock type, motion compensation type, and transform coding type of a coding unit in said first video format.

* * * * *